(12) United States Patent
Takada

(10) Patent No.: US 8,218,645 B2
(45) Date of Patent: Jul. 10, 2012

(54) METHOD AND APPARATUS FOR ENCODING AND DECODING BY WAVELET TRANSFORM

(75) Inventor: Jun Takada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/935,032

(22) PCT Filed: Mar. 29, 2010

(86) PCT No.: PCT/JP2010/002236
§ 371 (c)(1),
(2), (4) Date: Sep. 28, 2010

(87) PCT Pub. No.: WO2011/007478
PCT Pub. Date: Jan. 20, 2011

(65) Prior Publication Data
US 2011/0103489 A1    May 5, 2011

(30) Foreign Application Priority Data

Jul. 17, 2009 (JP) .................................. 2009-168638

(51) Int. Cl.
*H04N 7/12* (2006.01)
(52) U.S. Cl. ......... 375/240.19; 375/240.01; 375/240.18; 375/240.25; 375/240.26
(58) Field of Classification Search ............. 375/240.01, 375/240.18, 240.25, 240.26
See application file for complete search history.

(56) References Cited

U.S. PATENT DOCUMENTS

| 5,764,374 | A | 6/1998 | Seroussi et al. |
| 6,272,180 | B1 * | 8/2001 | Lei ........................... 375/240.16 |
| 7,065,252 | B1 * | 6/2006 | Malvar et al. ................. 382/232 |

FOREIGN PATENT DOCUMENTS

| JP | 6-189287 A | 7/1994 |
| JP | 2000316152 A | 11/2000 |
| JP | 2001285643 A | 10/2001 |
| JP | 2003274185 A | 9/2003 |
| WO | 2005081539 A | 9/2005 |
| WO | 2008007760 A | 1/2008 |

OTHER PUBLICATIONS

International Search Report for PCT/JP2010/002236 mailed Jul. 6, 2010.

* cited by examiner

*Primary Examiner* — Jay Au Patel
*Assistant Examiner* — Geepy Pe

(57) ABSTRACT

A wavelet transform encoding apparatus includes a coefficient encoding unit which encodes each group of multiple wavelet transform coefficients LH, HL, and HH located spatially at the same position within multiple high-frequency subbands belonging to the same hierarchy. At the time, the coefficient encoding unit calculates an encoding parameter for the wavelet transform coefficient of an encoding object based on multiple encoded vicinal wavelet transform coefficients within the multiple high-frequency subbands belonging to the same hierarchy, and encodes the wavelet transform coefficient of the encoding object into a variable-length code by utilizing the calculated encoding parameter.

27 Claims, 15 Drawing Sheets

FIG. 2

| LL | LH | LL | LH | LL | LH |
|----|----|----|----|----|----|
| HL | HH | HL | HH | HL | HH |
| LL | LH | LL | LH | LL | LH |
| HL | HH | HL | HH | HL | HH |

FIG. 3

| LL | LH | LL | LH WEIGHT 4 | LL | LH |
| HL | HH | HL WEIGHT 4 | HH WEIGHT 4 | HL WEIGHT 4 | HH |
| LL | LH WEIGHT 3 | LL | LH | LL | LH |
| HL | HH WEIGHT 1 | HL | HH | HL | HH |

FIG. 4

| LL | LH | LL | LH | LL | LH |
|---|---|---|---|---|---|
| HL | HH | HL<br>WEIGHT 4 | HH | HL | HH |
| LL | LH<br>WEIGHT 4 | LL | LH<br>WEIGHT 4 | LL | LH |
| HL<br>WEIGHT 4 | HH<br>WEIGHT 4 | HL | HH | HL | HH |

FIG. 5

| LL | LH | LL | LH | LL | LH |
|---|---|---|---|---|---|
| HL | HH | HL | HH WEIGHT 5 | HL | HH |
| LL | LH | LL | LH WEIGHT 5 | LL | LH |
| HL | HH WEIGHT 5 | HL WEIGHT 5 | HH | HL | HH |

FIG. 6

| WEIGHTED SUMMATION | QUANTIZED VALUE (ENCODING PARAMETER k) |
|---|---|
| 0~5 | 0 |
| 6~19 | 1 |
| 20~67 | 2 |
| 68~170 | 3 |
| 171~399 | 4 |
| 400~856 | 5 |
| 857~1370 | 6 |
| 1371~2421 | 7 |
| 2422~4844 | 8 |
| 4845~9690 | 9 |
| 9691~19381 | 10 |
| 19382~38764 | 11 |
| 38765~77530 | 12 |
| 77531~155061 | 13 |
| 155062~310124 | 14 |
| 310125~620250 | 15 |
| 620251~ | 16 |

# METHOD AND APPARATUS FOR ENCODING AND DECODING BY WAVELET TRANSFORM

The present application is the National Phase of PCT/JP2010/002236, filed Mar. 29, 2010, which claims priority from Japanese Patent Application No. 2009-168638, filed on Jul. 17, 2009 in Japan, the disclosure of which is incorporated herein by reference in its entirety.

TECHNICAL FIELD

The present invention generally relates to encoding and decoding of two-dimensional signals and, in particular, to a method and apparatus for encoding and decoding two-dimensional signals utilizing wavelet transform.

BACKGROUND ART

Wavelet transform encoding method is known as one of the methods for high-efficiency encoding of two-dimensional signals represented by image signals (for example, see Patent Document 1).

In the wavelet transform encoding method, first, wavelet transform is carried out for a two-dimensional signal. The wavelet transform is a kind of subband encoding, which carries out N-hierarchy band division by repeating subband division at the low-frequency side for band division in horizontal and vertical directions, respectively. Such kind of band division is called octave division. In the case of division up to three hierarchies, 10 subbands are available as shown in FIG. 15.

In FIG. 15, F0 to F3 are subbands of the lowest hierarchy; F4 to F6 are subbands of the hierarchy thereabove; and F7 to F9 are subbands of the highest hierarchy. Further, F1, F4, and F7 are subbands filtered through a lowpass filter in a horizontal direction and through a highpass filter in a vertical direction; F2, F5, and F8 are subbands filtered through a highpass filter in a horizontal direction and through a lowpass filter in a vertical direction; and F3, F0, and F9 are subbands filtered through a highpass filter in both horizontal and vertical directions. Further, F0 is called the lowest-frequency subband and, other than F0, F1 to F9 are called high-frequency subbands.

A wavelet transform coefficient is included in each of the subbands F0 to F9. In the present description, the wavelet transform coefficient called HL is included in such subbands as F1, F4, and F7 filtered through a lowpass filter in a horizontal direction and through a highpass filter in a vertical direction. Further, the wavelet transform coefficient called LH is included in such subbands as F2, F5, and F8 filtered through a highpass filter in a horizontal direction and through a lowpass filter in a vertical direction. Further, the wavelet transform coefficient called HH is included in such subbands as F3, F6, and F9 filtered through as highpass filter in both horizontal and vertical directions. Further, the wavelet transform coefficient called LL is included in the lowest-frequency subband F0. Furthermore, the same coordinates are assigned to the wavelet transform coefficients LH, HL, and HH of the same spatial coordinates in the multiple high-frequency subbands of the same hierarchy to be expressed, for example, as LH (i, j), HL (i, j), and HH (i, j). Therein, x represents a horizontal direction, and y represents a vertical direction; thus, the coordinates are expressed as (x, y).

When wavelet transform is carried out in the above manner, the electric power is inclined to the wavelet transform coefficient LL included in the lowest-frequency subband, and the wavelet transform coefficients LH, HL, and HH included in the high-frequency subbands become approximately zero in value. Therefore, it is possible to compress the amount of information by utilizing variable-length codes the code length of which becomes as shorter as the value gets closer to zero to encode the wavelet transform coefficients LH, HL, and HH included in the high-frequency subbands. Further, because quantizing the wavelet transform coefficients LH, HL, and HH increases the number of the wavelet transform coefficients of zero, it is possible to further highly compress the amount of information by concomitantly utilizing run length compression or encoding.

Herein, as methods for encoding the wavelet transform coefficients included in the high-frequency subbands, there are a method of respectively encoding LH, HL, and HH such as JPEG2000, and a method of collectively encoding LH, HL, and HH located spatially at the same position within the multiple subbands belonging to the same hierarchy such as shown in Patent Document 3.

On the other hand, in wavelet transform decoding, the original two-dimensional signal is restored by inputting the code string created by wavelet transform encoding, and following the procedure opposite to the encoding.

As an example of the variable-length codes the code length of which becomes as shorter as the value gets closer to zero, there is as Golomb-Rice code. The Golomb-Rice code outputs a signal value as "a unary code"+"a k-bit fixed-length code", wherein k is an encoding parameter for giving an estimate value of the number of significant digits.

When the Golomb-Rice code is utilized for encoding, the binary number of an encoding object is divided into the low k bits and the high rest bits; the high rest bits are replaced by a unary code. For example, when the signal 00010011 (binary expression) is encoded with k=3, after the high 5 bits (00010) excluding the low 3 bits are encoded into as unary code, the low 3 hits are outputted as they are. In the case of utilizing a code of adding, a bit "1" to the bits "0" which are just the number expressed by the bit string as a unary code, in the above example, since the numerical value of the high 5 bits is 2, 2 bits of "0" terminated with the bit "1" are outputted. Together with the low 3 bits, "001011" is finally outputted as the code.

Decoding a Golomb-Rice code utilizes the same value of k utilized in the encoding to divide the binary number of a decoding object into the low k bits and the high rest bits, and restore the high rest bits to the pre-unary-code state. For example, in decoding the code "001011" encoded with k=3 of the above, example, first, the numerical value "2" is decoded from the unary code "001" and outputted as the high 5 bits "00010" and, further, the succeeding "011" is outputted as the low 3 bits. As a result, the signal 00010011 is acquired which completely matches the original signal. In this manner, the Golomb-Rice code is a kind of reversible compression codes.

The Golomb-Rice code has a shortest code length when the value k matches the significant digits of the signal value to be encoded. In the above example of the signal 00010011, because the significant digits are 5, if k=5, then the outputted code is 110011, and the code length becomes the shortest. Therefore, there is proposed an adaptive Golomb-Rice code which dynamically predicts the value k.

An example of adaptive Golomb-Rice codes is described in Patent Document 2. In the adaptive Golomb-Rice code described in Patent Document 2, the optimum value k is predicted from the statistic of the signal value d of a Golomb-Rice encoding object (in Patent Document 2, prediction error is taken as the Golomb-Rice encoding object). In particular, by accumulating the absolute values of the signal values d having appeared so far, the average number of significant digits "k" is estimated from the summation of the accumulated values "a" and the number of accumulations "n". Further, when the number of accumulations reaches a predetermined upper limit (Reset), a resealing process is carried out to halve the accumulated value and the number of accumulations, respectively. On the other hand, in Golomb-Rice decoding, in order to acquire the same value of k as that at the encoding side, by accumulating the absolute values of the signal values d having been decoded into Golomb-Rice codes so far, the same number of significant digits "k" as utilized in the Golomb-Rice encoding is estimated from the summation of the accumulated values "a" and the number of accumulations "n". Further, when the number of accumulations reaches to predetermined upper limit (Reset), a resealing process is carried out to halve the accumulated value and the number of accumulations, respectively.

[Patent Document 1] JP 2003-274185 A
[Patent Document 2] US 00/5764374 A
[Patent Document 3] WO 2005/081539
[Patent Document 4] JP 2001-185643 A In the wavelet transform encoding methods as described hereinabove, it is possible to compress the amount of information by encoding with a variable-length code the wavelet transform coefficients LH, HL, and HH included in high-frequency subbands. However, the encoding parameter must be suitable for the encoding. This is because in the case of utilizing variable-length codes such as a Golomb-Rice code and the like, a good or bad method for estimating the encoding parameter k greatly affects the compression ratio.

In Patent Document 2, by accumulating the absolute values of the signal values d having appeared so far, the average number of significant digits "k" is estimated from the summation of the accumulated values "a" and the number of accumulations "n". Because this estimation method is proposed on the premise of taking prediction error as the Golomb-Rice encoding object, it is suitable for the case of respectively encoding LH, HL, and HH. However, it is difficult to seek a suitable encoding parameter for the case of collectively encoding LH, HL, and HH located spatially at the same position within the multiple subbands belonging to the same hierarchy. The reason is that in the wavelet transform coefficients which have appeared so far, there are included a number of coefficients which are spatially far away from the encoding object wavelet transform coefficients, and/or different in kinds a LH, HL, and HH.

SUMMARY

In view of the above, an exemplary object of the present invention is to provide to method and apparatus for wavelet transform encoding and decoding which have solved the problem that it is difficult to seek a suitable encoding parameter for the case of collectively encoding LH, HL, and HH located spatially at the same position within the multiple subbands belonging to the same hierarchy.

An aspect in accordance with the present invention provides a wavelet transform encoding apparatus including: a wavelet transform unit for decomposing a two-dimensional signal into subbands which are multiple frequency domains, and a coefficient encoding unit for encoding wavelet transform coefficients for each group of multiple wavelet transform coefficients located spatially at the same position within multiple high-frequency subbands belonging to the same hierarchy, the coefficient encoding unit including an encoding parameter calculation unit for calculating an encoding parameter for the wavelet transform coefficient of an encoding object based on multiple encoded vicinal wavelet transform coefficients within the multiple high-frequency subbands belonging to the same hierarchy; and a coefficient variable-length encoding unit for encoding the wavelet transform coefficient of the encoding object into a variable-length code by utilizing the encoding parameter calculated by the encoding parameter calculation unit.

Another aspect in accordance with the present invention provides a wavelet transform decoding apparatus including: a coefficient decoding unit for decoding wavelet transform coefficients front a code string of variable-length codes into which are encoded multiple subband wavelet transform coefficients acquired by wavelet transform for each group of the multiple wavelet transform coefficients located spatially at the same position within multiple high-frequency subbands belonging to the same hierarchy, the coefficient decoding unit including an encoding parameter calculation unit for calculating an encoding parameter for the wavelet transform coefficient of an decoding object based on multiple decoded vicinal wavelet transform coefficients within the multiple high-frequency subbands; and a coefficient variable-length decoding unit for decoding the wavelet transform coefficient of the encoding object by utilizing the encoding parameter calculated by the encoding parameter calculation unit.

Still another aspect in accordance with the present invention provides a wavelet transform encoding method including the steps of: decomposing a two-dimensional signal into subbands which are multiple frequency domains; and encoding wavelet transform coefficients for each group of multiple wavelet transform coefficients located spatially at the same position within multiple high-frequency subbands belonging to the same hierarchy, in the step of encoding wavelet transform coefficients for each group, calculating the encoding parameter for the wavelet transform coefficient of an encoding object based on multiple encoded vicinal wavelet transform coefficients within the multiple high-frequency subbands belonging to the same hierarchy; and encoding the wavelet transform coefficient of the encoding object into a variable-length code by utilizing the calculated encoding parameter.

Still another aspect in accordance with the present invention provides a wavelet transform decoding method including the step of: decoding wavelet transform coefficients from at code string of variable-length codes into which are encoded multiple subband wavelet transform coefficients acquired by wavelet transform for each group of the multiple wavelet transform coefficients located spatially at the sine position within multiple high-frequency subbands belonging to the same hierarchy, in the step of decoding wavelet transform coefficients for each group, calculating the encoding parameter for the wavelet transform coefficient of an decoding object based on multiple decoded vicinal wavelet transform coefficients within the multiple high-frequency subbands; and decoding the wavelet transform coefficient of the encoding object by utilizing the calculated encoding parameter.

Because the present invention is such configured as described hereinabove, it is possible to seek a suitable encoding parameter for the case of collectively encoding LH, HL, and HH located spatially at the same position within the multiple subbands belonging to the same hierarchy. Thereby, it is possible to provide a method and apparatus for wavelet transform encoding and decoding which have further improved the compression ratio.

BRIEF DESCRIPTION OF THE DRAWINGS

FIG. 2 is an explanatory diagram of a group of wavelet transform coefficients LH, HL, and HH located spatially at the same position;

FIG. 3 is an explanatory diagram of other multiple reference wavelet transform coefficients for seeking an encoding parameter in encoding the wavelet transform coefficient LH into a variable-length code;

FIG. 4 is an explanatory diagram of other multiple reference wavelet transform coefficients for seeking an encoding parameter in encoding the wavelet transform coefficient HH into a variable-length code;

FIG. 5 is an explanatory diagram of other multiple reference wavelet transform coefficients for seeking an encoding parameter in encoding the wavelet transform coefficient HH into a variable-length code;

FIG. 6 is a quantization table showing as correspondence relationship between values of weighted summation and the quantized value (encoding parameter k);

FIG. 11 is an explanatory diagram of reference wavelet transform coefficients for determining whether or not to enter a run-length mode;

Figure 15:
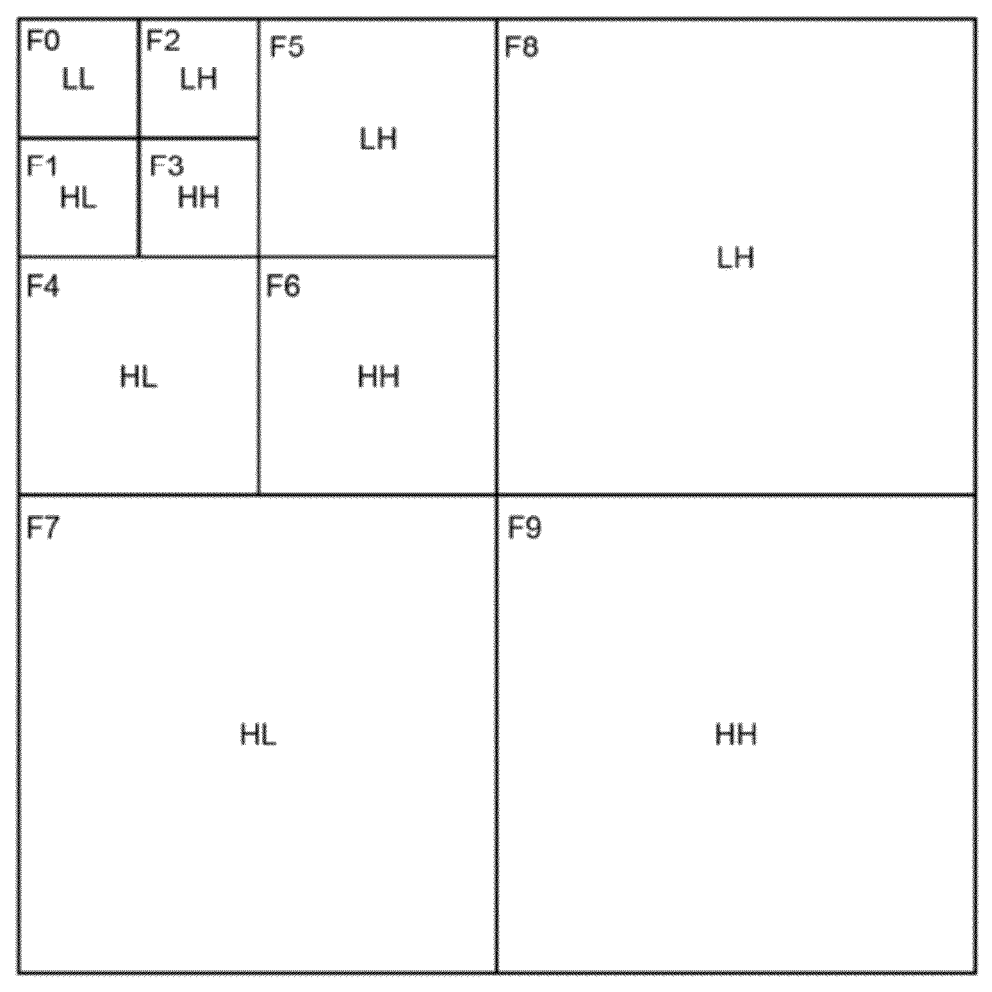

FIG. 15 is an explanatory diagram of a three-hierarchy wavelet transform.

EXEMPLARY EMBODIMENTS

Next, exemplary embodiments of the present invention will be described in detail with reference to the accompanying drawings.

Figure 1:
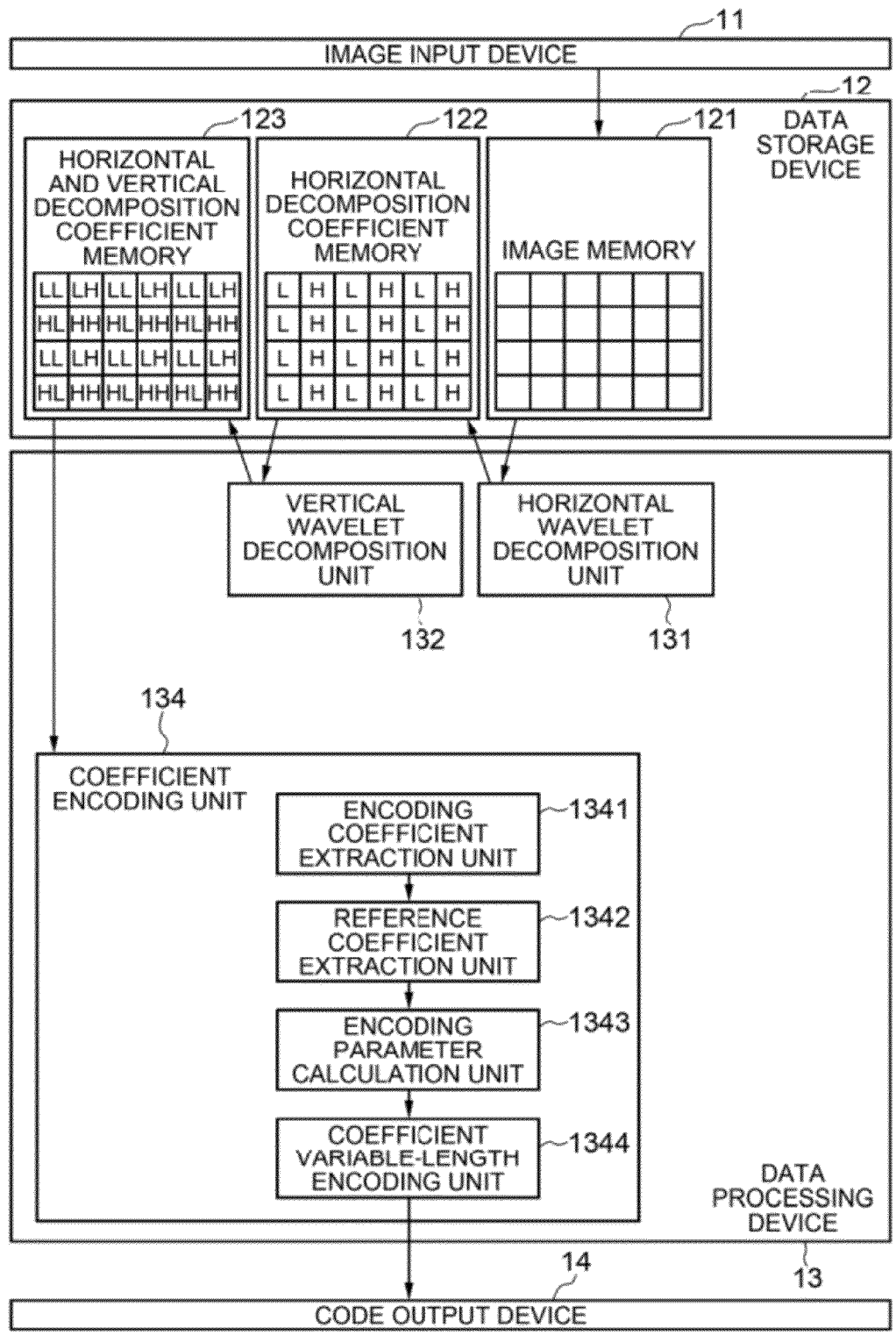
FIG. 1 is a block diagram of a wavelet transform encoding apparatus in accordance with a first exemplary embodiment of the present invention.

In reference to FIG. 1, a first exemplary embodiment of the present invention is comprised of an image input device 11, a data storage device 12, a data processing device 13 operating under program control, and a code output device 14.

The image input device 11 is a device for inputting images as two-dimensional signals and comprised, for example, of a camera, a communication device, and the like.

The data storage device 12 includes an image memory 121, a horizontal decomposition coefficient memory 122, and a horizontal and vertical decomposition coefficient memory 123.

The image memory 121 stores the image inputted from the image input device 11.

The horizontal decomposition coefficient memory 122 stores the horizontal decomposition coefficients acquired by carrying out horizontal wavelet decomposition for the input image stored in the image memory 121.

The horizontal and vertical decomposition coefficient memory 123 stores the horizontal and vertical decomposition coefficients acquired by carrying out vertical wavelet decomposition for the horizontal decomposition coefficients stored in the horizontal decomposition coefficient memory 122.

The data processing device 13 includes a horizontal wavelet decomposition unit 131, a vertical wavelet decomposition unit 132, and a coefficient encoding unit 134.

The horizontal wavelet decomposition unit 131 is composed of a 5-3 integer-type filter, a 9-7 integer-type filter, and the like. Reading out the input image stored in the image memory 121 in a raster scanning order one line at a time in a horizontal direction and processing the same, the horizontal wavelet decomposition unit 131 creates the horizontal decomposition coefficients and stores the same in the horizontal decomposition coefficient memory 122. As shown in the horizontal decomposition coefficient memory 122, "H" indicates the horizontal decomposition coefficients at the high-frequency side, whereas "L" indicates the horizontal decomposition coefficients at the low-frequency side.

In the same manner as the horizontal wavelet decomposition unit 131, the vertical wavelet decomposition unit 132 is comprised of a 5-3 integer-type filter, a 9-7 integer-type filter, and the like. Reading out the horizontal decomposition coefficients stored in the horizontal decomposition coefficient memory 122 one line at a time in a vertical direction and processing the same, the vertical wavelet decomposition unit 132 creates the horizontal and vertical decomposition coefficients LH, HL, HH, and LL, and stores the same in the horizontal and vertical decomposition coefficient memory 123.

In this manner, the horizontal wavelet decomposition unit 131 and the vertical wavelet decomposition unit 132 constitute a wavelet transform unit. Herein, after the horizontal wavelet decomposition has been carried out for a whole input image, all the horizontal decomposition coefficients may once be stored in the horizontal decomposition coefficient memory 122, and then read out from the horizontal decomposition coefficient memory 122 to undergo the vertical wavelet decomposition. However, in order to speed up the processing and reduce the amount of memory, the wavelet transform coefficients LL, LH, HL, and HH may also be sought successively by starting the behavior of the vertical wavelet decomposition unit as soon as the horizontal wavelet decomposition unit 131 has acquired a few lines of the horizontal decomposition coefficients (for example, see the first exemplary embodiment of Patent Document 4).

Further, in the first exemplary embodiment, the wavelet transform is carried out for one hierarchy. However, the present invention is, of course, applicable to cases of carrying out wavelet transform for more than one hierarchy as well. Then, in the cases of carrying out wavelet transform for more than one hierarchy, the wavelet transform coefficients for each hierarchy may also be sought successively (for example, see the second exemplary embodiment of Patent Document 4).

With the Golomb-Rice code, the coefficient encoding unit 134 encodes the wavelet transform coefficients LH, HL, and HH included in the high-frequency subbands among those stored in the horizontal and vertical decomposition coefficient memory 123. At the time, the coefficient encoding unit 134 extracts multiple groups of the wavelet transform coefficients LH, HL, and HH located spatially at the same position within the multiple high-frequency subbands belonging to the same hierarchy in a raster scanning order, and carries out encoding for each group.

The coefficient encoding unit 134 is comprised of an encoding coefficient extraction unit 1341, a reference coefficient extraction unit 1342, an encoding parameter calculation unit 1343, and a coefficient variable-length encoding unit 1344.

The encoding coefficient extraction unit 1341 extracts the encoding object wavelet transform coefficients in a predetermined order from a group of LH, HL, and HH with the same coordinate value. In particular, if the portion encircled with the bold solid line in FIG. 2 is a group of LH, HL, and HH with the smite coordinate value, then first LH, next HL, and last HH are extracted from this group.

The reference coefficient extraction unit 1342 extracts other multiple reference wavelet transform coefficients for calculating the encoding parameters k for the encoding object wavelet transform coefficients extracted by the encoding coefficient extraction unit 1341. The reference wavelet transform coefficients are extracted not only from the subbands to which the encoding object wavelet transform coefficients belong but also from other subbands of the same hierarchy.

FIG. 3 shows a particular example of the reference wavelet transform coefficients for calculating the encoding parameter k for the wavelet transform coefficient LH. Supposing that (i, j) is the coordinate value of the encoding object wavelet transform coefficient LH encircled with the bold solid line, reference is made to the hatched six wavelet transform coefficients in total as follows:

(1) the wavelet transform coefficient LH of the coordinate value (i, j−1);
(2) the wavelet transform coefficient LH of the coordinate value (i−1, j);
(3) the wavelet transform coefficient HL of the coordinate value (i, j−1);
(4) the wavelet transform coefficient HL of the coordinate value (i+1, j−1);
(5) the wavelet transform coefficient HH of the coordinate value (i, j−1); and
(6) the wavelet transform coefficient HH of the coordinate value (i−1, j).

However, a predetermined value (zero, for example ) is utilized for wavelet transform coefficients of no corresponding coordinate values.

FIG. 4 shows a particular example of the reference wavelet transform coefficients for calculating the encoding parameter k for the wavelet transform coefficient HL. Supposing that (i, j) is the coordinate value of the encoding object wavelet transform coefficient HL encircled with the hold solid line, reference is made to the hatched five wavelet transform coefficients in total as follows:

(1) the wavelet transform coefficient HL of the coordinate value (i, j−1);
(2) the wavelet transform coefficient HL of the coordinate value (i−1, j);
(3) the wavelet transform coefficient LH of the coordinate value (i−1, j−1);
(4) the wavelet transform coefficient LH of the coordinate value (i, j); and
(5) the wavelet transform coefficient HH of the coordinate value (i−1, j).

However, a predetermined value (zero, for example) is utilized for wavelet transform coefficients of no corresponding coordinate values.

FIG. 5 shows a particular example of the reference wavelet transform coefficients for calculating the encoding parameter k for the wavelet transform coefficient HH. Supposing that (i, j) is the coordinate value of the encoding object wavelet transform coefficient HH encircled with the bold solid line, reference is made to the hatched four wavelet transform coefficients in total as follows:

(1) the wavelet transform coefficient HH of the coordinate value (i, j−1);
(2) the wavelet transform coefficient HH of the coordinate value (i−1, j);
(3) the wavelet transform coefficient LH of the coordinate value (i, j); and
(4) the wavelet transform coefficient HL of the coordinate value (i, j).

However, a predetermined value (zero, for example) is utilized for wavelet transform coefficients of no corresponding coordinate values.

For each encoding object wavelet transform coefficient extracted by the encoding coefficient extraction unit 1341, the encoding parameter calculation unit 1343 calculates the encoding parameter k by weighting and adding the absolute values of the multiple wavelet transform coefficients extracted by the reference coefficient extraction unit 1342, and quantizing the value of the weighed summation by carrying out operations such as division by a predetermined value, right shift, and the like, so as to predict the significant digits of the encoding object wavelet transform coefficients LH, HL, and HH.

The weight for each wavelet transform coefficient is set as greater in value as the coefficient has a closer correlation with the encoding object wavelet transform coefficient. Generally, as greater weight is assigned to the one closer in distance to the encoding object wavelet transform coefficient. Further, because the correlation varies in degree with direction such as LH has a closer correlation in a vertical direction than in a horizontal direction, etc., a greater weight is assigned to the coefficients located in the direction of a closer correlation with the encoding object wavelet transform coefficient. FIGS. 3 to 5 show respective examples of the weights for those coefficients with the values affixed to the hatched wavelet transform coefficients.

The encoding parameter calculation unit 1343 may also seek the encoding parameter k by carrying out linear quantization for the value of the weighted summation. However, it is more effective to carry out nonlinear quantization therefor. For example, as shown in FIG. 6, if the data storage device 12 prestores a quantization table indicating a correspondence relationship between values of the weighted summation and the quantized value (that is, the encoding parameter k), then the encoding parameter calculation unit 1343 may seek the encoding parameter k by referring to this quantization table.

The coefficient variable-length encoding unit 1344 utilizes the encoding parameter k calculated by the encoding parameter calculation unit 1343 to encode the encoding object wavelet transform coefficient into a Golomb-Rice code. Then, the coefficient variable-length encoding unit 1344 outputs the created Golomb-Rice code to the code output device 14.

In the first exemplary embodiment, because the wavelet transform is carried out for one hierarchy, the wavelet transform coefficient LL stored in the horizontal and vertical decomposition coefficient memory 123 is encoded by utilizing an encoding unit for LL (not shown) with an encoding method such as LZW and the like, and then outputted to the code output device 14. In addition, the cases of carrying out wavelet transform for more than one hierarchy, the wavelet transform coefficient LL stored in the horizontal and vertical decomposition coefficient memory 123 is recursively decomposed into wavelets. Then, the created wavelet transform coefficients LH, HL, and HH of the high-frequency subbands are encoded to Golomb-Rice codes by utilizing the coefficient encoding unit 134 with the same method as described hereinabove. On the other hand, the last wavelet transform coefficient LL of the lowest-frequency subband is encoded by an encoding unit (not shown), and then outputted to the code output device 14.

The code output device 14 is comprised of a storage device such as a magnetic disk device and the like for storing the created codes, as communication device for transmitting the created codes to a remote place, and the like.

Figure 7:
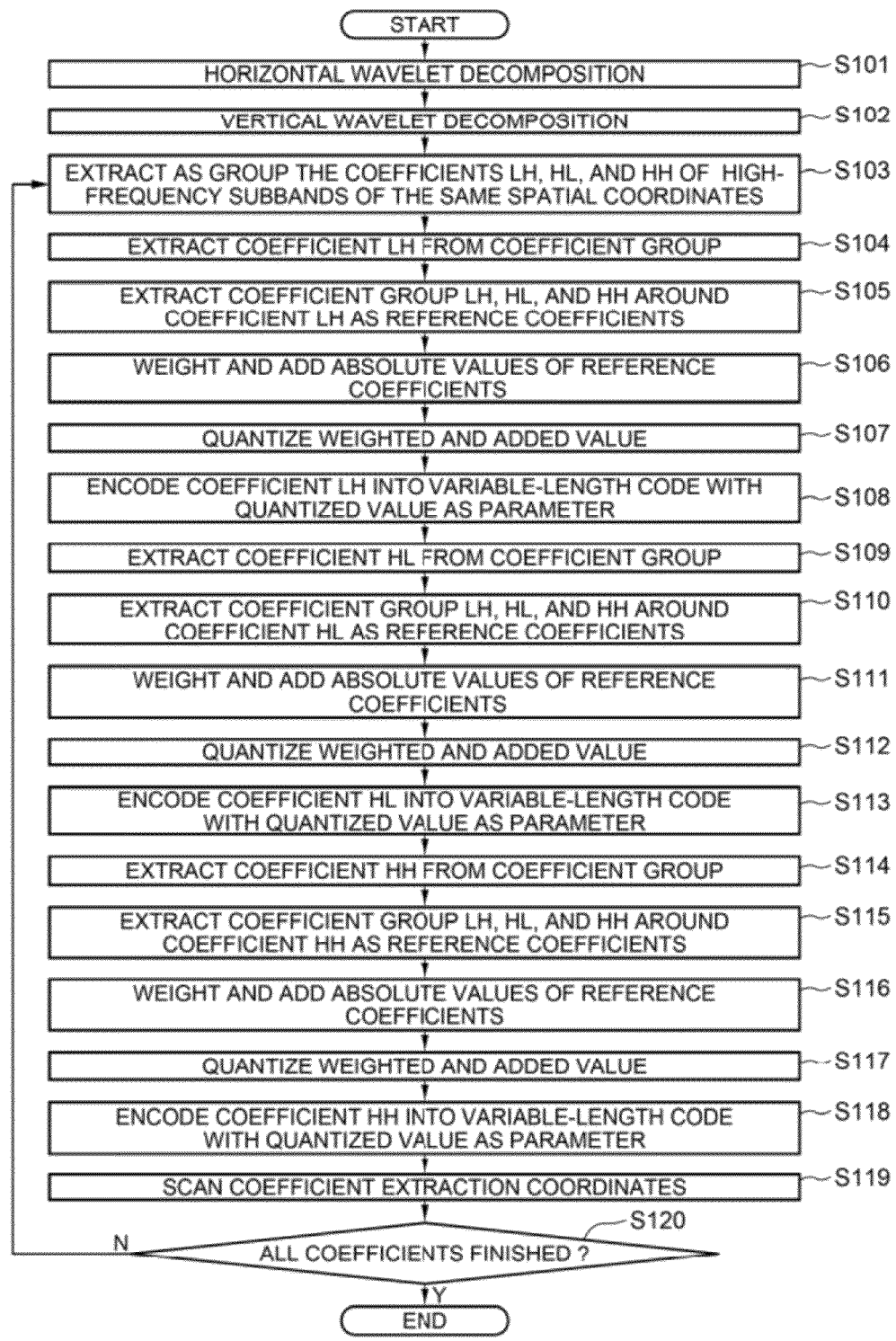
FIG. 7 is a flowchart showing a behavior of the wavelet transform encoding apparatus in accordance with the first exemplary embodiment of the present invention.

Next, an overall behavior of the first exemplary embodiment will he described with reference to the flowchart of FIG. 7.

Once an image is inputted horn the image input device 11 to the image memory 121, the horizontal wavelet decomposition unit 131 carries out horizontal wavelet decomposition for the input image, and stores the acquired horizontal decomposition coefficients L and H in the horizontal decomposition coefficient memory 122 (step S101). Subsequently, the vertical wavelet decomposition unit 132 carries out vertical wavelet decomposition for the horizontal decomposition coefficients stored in the horizontal decomposition coefficient memory 122, and stores the acquired wavelet transform coefficients LL, LH, HL and HH in the horizontal and vertical decomposition coefficient memory 123 (step S102).

Next, the coefficient encoding unit 134 initializes the extraction coordinates to (0, 0), and extracts one group of the wavelet transform coefficients LH, HL, and HH of the respective high-frequency subbands located at the same spatial coordinates from the horizontal and vertical decomposition coefficient memory 123 in a raster scanning order (step S103).

Next, the encoding coefficient extraction unit 1341 extracts the wavelet transform coefficient LH as the encoding object from the above group (step S104). Next, the reference coefficient extraction unit 1342 extracts the wavelet transform coefficients LH, HL, and HH around the wavelet transform coefficient LH as the reference coefficients (step S105). Next, the encoding parameter calculation unit 1343 weights and adds the absolute values of the reference coefficients (step S106), and quantizes the weighted and added value to create the encoding parameter k for the Golomb-Rice code (step S107). Next, the coefficient variable-length encoding unit 1344 utilizes the created encoding parameter k to encode the wavelet transform coefficient LH into the Golomb-Rice code (step S108). The created Golomb-Rice code is outputted to the code output device 14.

Next, the encoding coefficient extraction unit 1341 extracts the wavelet transform coefficient HL as the encoding object from the above group (step S109). Next, the reference coefficient extraction unit 1342 extracts the wavelet transform coefficients LH, HL, and HH around the wavelet transform coefficient HL as the reference coefficients (step S110). Next, the encoding parameter calculation unit 1343 weights and adds the absolute values of the reference coefficients (step S111), and quantizes the weighted and added value to create the encoding parameter k for the Golomb-Rice code (step S112). Next, the coefficient variable-length encoding unit 1344 utilizes the created encoding parameter k to encode the wavelet transform coefficient HL into the Golomb-Rice code (step S113). The created Golomb-Rice code is outputted to the code output device 14.

Next, the encoding coefficient extraction unit 1341 extracts the wavelet transform coefficient HH as the encoding object from the above group (step S114). Next, the reference coefficient extraction unit 1342 extracts the wavelet transform coefficients LH, HL, and HH around the wavelet transform coefficient HH as the reference coefficients (step S115). Next, the encoding parameter calculation unit 1343 weights and adds the absolute values of the reference coefficients (step S116), and quantizes the weighted and added value to create the encoding parameter k for the Golomb-Rice code (step S117). Next, the coefficient variable-length encoding unit 1344 utilizes the created encoding parameter k to encode the wavelet transform coefficient HH into the Golomb-Rice code (step S118). The created Golomb-Rice code is outputted to the code output device 14.

The coefficient encoding unit 134 scans the coefficient extraction coordinates to the next in a raster scanning order (step S119), and determines whether or not the encoding process is finished for every group of the wavelet transform coefficients LH, HL, and HH of the high-frequency subbands (step S120). If not, the process moves back to the step S103 to repeat the same process as described hereinabove for the next group of the wavelet transform coefficients LH, HL, and HH of the respective high-frequency subbands of the same spatial coordinates. If the encoding process is finished for every group of the wavelet transform coefficients LH, HL, and HH, the coefficient encoding unit 134 ends the process of FIG. 7.

In this manner, according to the first exemplary embodiment, it is possible to seek a suitable encoding parameter for the case of collectively encoding the wavelet transform coefficients LH, HL, and HH located spatially at the same position within the multiple subbands belonging to the same hierarchy, thereby allowing the wavelet transform encoding to further improve the compression ratio.

This is because it is possible to further optimize the encoding parameters for the encoding object wavelet transform coefficients.

The reason for being able to further optimize the encoding parameters is that the encoding parameter for the encoding object wavelet transform coefficient is calculated by utilizing the vicinal wavelet transform coefficients within the subbands to which the encoding object wavelet transform coefficient belongs, and the vicinal wavelet transform coefficients within other subbands of the same hierarchy.

Herein, the reason for utilizing not only the vicinal wavelet transform coefficients within the subbands to which the encoding object wavelet transform coefficient belongs but also the vicinal wavelet transform coefficients within other subbands of the same hierarchy is that only a small number of the wavelet transform coefficients can be utilized with the vicinal wavelet transform coefficients within the subbands to which the encoding object wavelet transform coefficient belongs alone. Further, another reason is that although the directions of decomposition are different, the vicinal wavelet transform coefficients within other subbands of the same hierarchy are located at a closer position than the vicinal wavelet transform coefficients within the subbands to which the encoding object wavelet transform coefficient belongs.

Further, the multiple reference wavelet transform coefficients for determining the encoding parameter exist on the same line of the encoding object wavelet transform coefficient or the previous line. Therefore, it is easy to match up with the method for speeding up the processing and reducing the amount of memory by starting the behavior of the vertical wavelet decomposition unit as soon as a few lines of the horizontal decomposition coefficients are acquired by the horizontal wavelet decomposition unit 131.

Next, a second exemplary embodiment of the present invention will be described with reference to the accompanying drawings.

Figure 8:
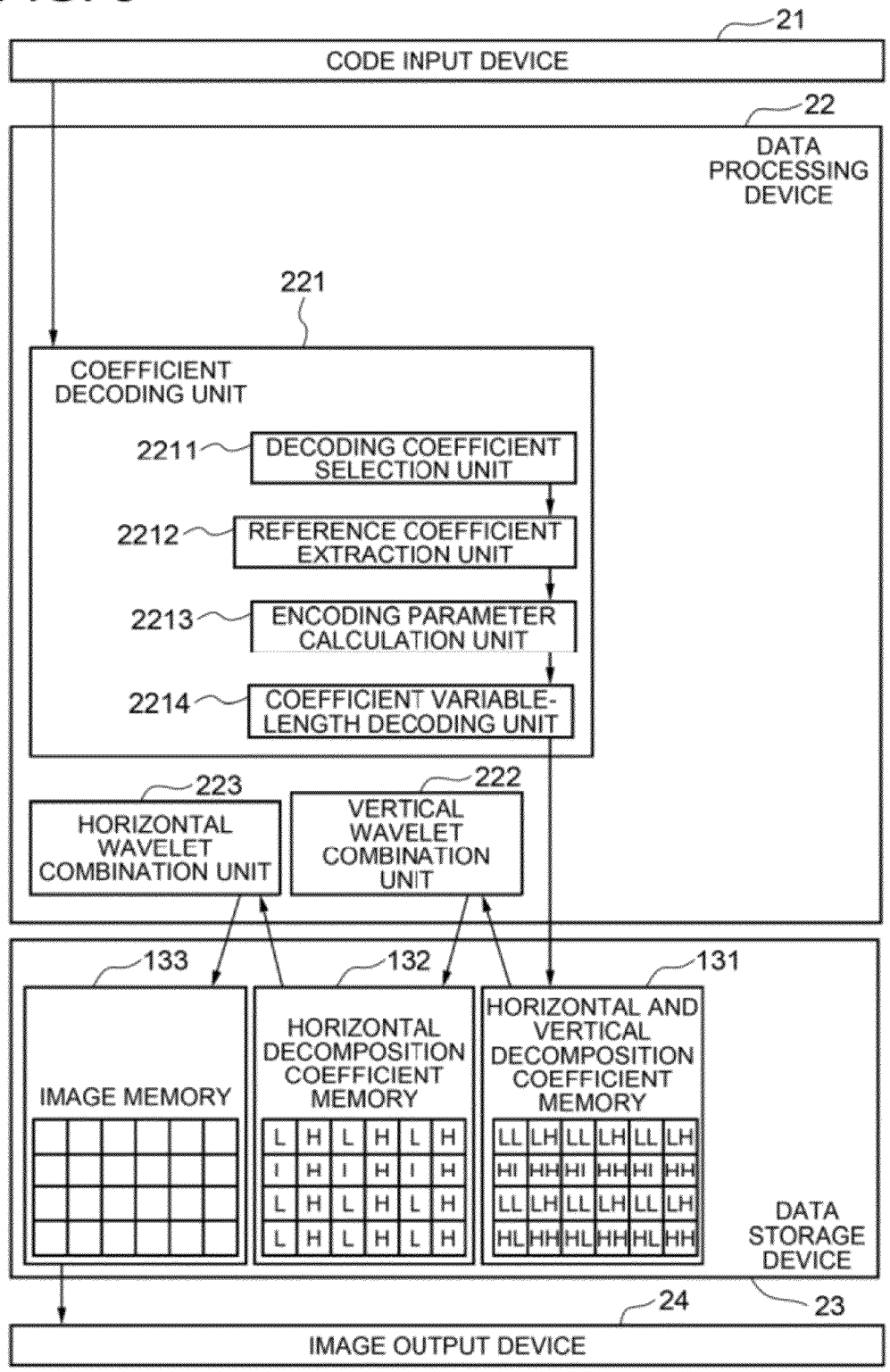
FIG. 8 is a block diagram of a wavelet transform encoding apparatus in accordance with a second exemplary embodiment of the present invention.

In reference to FIG. 8, the second exemplary embodiment of the present invention is comprised of a code input device 21, a data processing device 22 operating under program control, a data storage device 23, and an image output device 24.

The code input device 21 is a device for inputting decoding object codes and comprised, for example, of as magnetic disk device, to communication device, and the like.

The data storage device 23 includes a horizontal and vertical decomposition coefficient memory 123, a horizontal decomposition coefficient memory 122, and an image memory 133.

The horizontal and vertical decomposition coefficient memory 123 stores the wavelet transform coefficients LH, HL, and HH of the high-frequency subbands and the wavelet transform coefficient LL of the lowest-frequency subband which have been decoded by the data processing device 22.

The horizontal decomposition coefficient memory 122 stores the horizontal decomposition coefficients decoded by the data process mg device 22.

The image memory 133 stores the image decoded by the data processing device 22.

The data processing device 22 includes a coefficient decoding unit 221, a vertical wavelet combination unit 222, and a horizontal wavelet combination unit 223.

The coefficient decoding unit 221 decodes the code inputted from the code input device 21, and creates the wavelet transform coefficients LH, HL, and HH, of the high-frequency subbands. The coefficient decoding unit 221 selects multiple groups of the wavelet transform coefficients LH, HL, and HH located spatially at the same position within the multiple high-frequency subbands belonging to the same hierarchy in a raster scanning order, and carries out decoding for each group. The created wavelet transform coefficients LH, HL, and HH are stored in the horizontal and vertical decomposition coefficient memory 123.

The coefficient decoding unit 221 is comprised of a decoding coefficient selection unit 2211, a reference coefficient extraction unit 2212, an encoding parameter calculation unit 2213, and a coefficient variable-length decoding unit 2214.

The decoding coefficient section unit 2211 selects the wavelet transform coefficient to be decoded in the same order as encoded from a group of the multiple wavelet transform coefficients LH, HL, and HH located spatially at the same position within the multiple high-frequency subbands belonging to the same hierarchy. In particular, first LH, next HL, and last HH are selected.

The reference coefficient extraction unit 2212 extracts the reference wavelet transform coefficients for calculating the encoding parameters k of the decoding object wavelet transform coefficients selected by the decoding coefficient selection unit 2211. The reference wavelet transform coefficients are the same as in encoding. That is, the reference wavelet transform coefficients for calculating the encoding parameter k for the wavelet transform coefficient LH encircled with the bold solid line are the hatched six in total in FIG. 3. Further, the reference wavelet transform coefficients for calculating the encoding parameter k for the wavelet transform coefficient HL are the hatched five in total in FIG. 4. Furthermore, the reference wavelet transform coefficients for calculating the encoding parameter k for the wavelet transform coefficient HH are the hatched four in total in FIG. 5.

For each decoding object wavelet transform coefficient selected by the decoding coefficient selection unit 2211, the encoding parameter calculation unit 2213 calculates the same encoding parameter k as utilized in encoding based on the multiple wavelet transform coefficients extracted by the reference coefficient extraction unit 2212. In particular, the encoding parameter k is calculated by weighting and adding the absolute values of the multiple wavelet transform coefficients extracted by the reference coefficient extraction unit 2212, and quantizing the value of the weighed summation.

The coefficient variable-length decoding unit 2214 utilizes the encoding parameter k calculated by the encoding parameter calculation unit 2213 to decode the decoding object wavelet transform coefficient from the Golomb-Rice code inputted from the code input device 21. Then, the coefficient variable-length decoding unit 2214 outputs the decoded wavelet transform coefficient to the horizontal and vertical decomposition coefficient memory 123.

Graphical interpretation is omitted for the decoding unit for creating the wavelet transform coefficient LL of the lowest-frequency subband from the code inputted from the code input device 21. The wavelet transform coefficient LL of the lowest-frequency subband is also stored in the horizontal and vertical decomposition coefficient memory 123.

The venial wavelet combination unit 222 reads out the wavelet transform coefficients LL, LH, HL, and HH stored in the horizontal and vertical decomposition coefficient memory 123 one line at a time in a vertical direction to carry out vertical wavelet combination, and stares the acquired horizontal decomposition coefficients L and H in the horizontal decomposition coefficient memory 122.

The horizontal wavelet combination unit 223 reads out the horizontal decomposition coefficients L and H gored in the horizontal decomposition coefficient memory 122 one line at a time in a horizontal direction to carry out horizontal wavelet combination, and stores the acquired pixel data in the image memory 133.

The image output device 24 is constituted by such as a display device for reading out and outputting the pixel data stored in the image memory 133.

Figure 9:
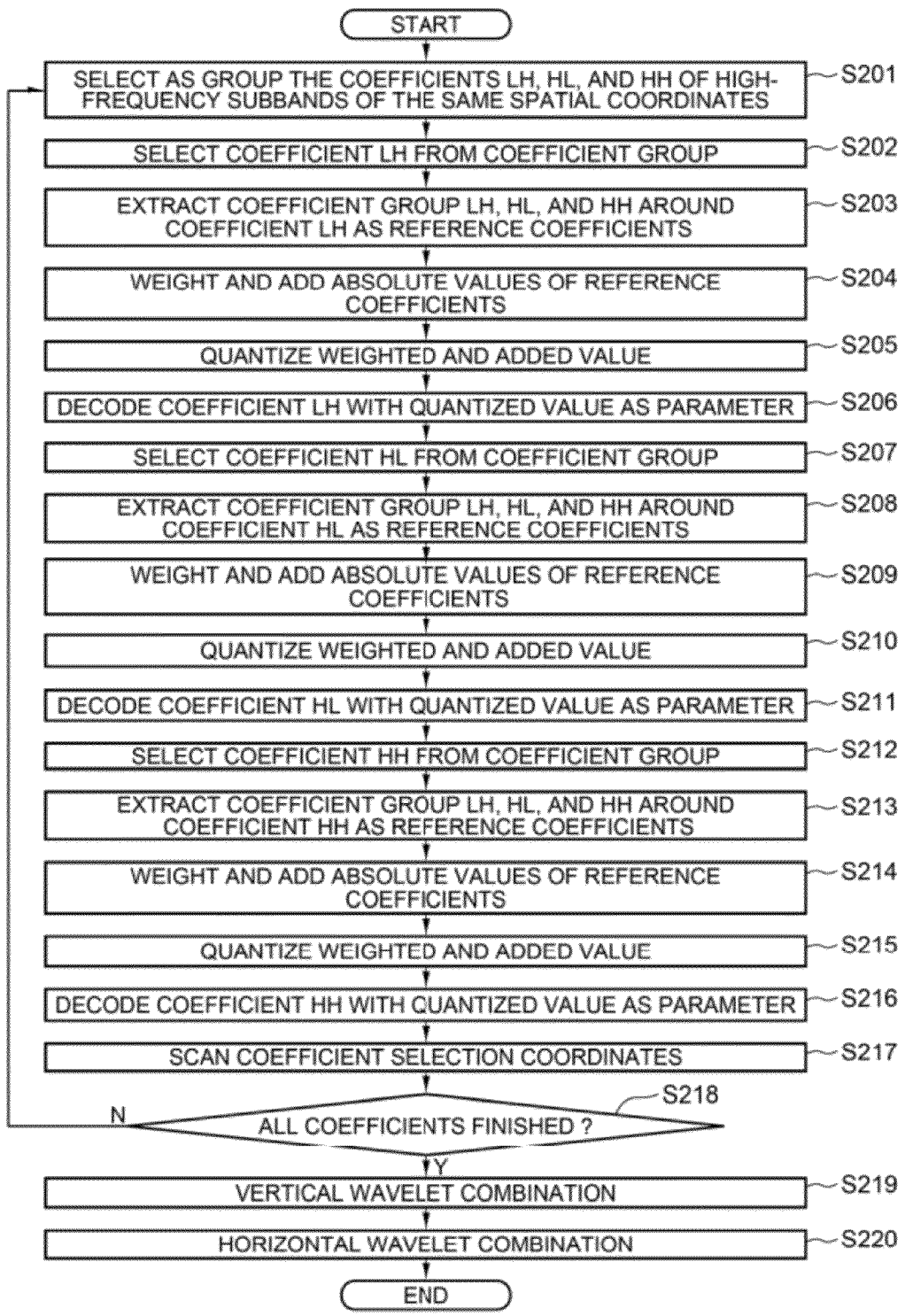
FIG. 9 is a flowchart showing a behavior of the wavelet transform encoding apparatus in accordance with the second exemplary embodiment of the present invention.

Next, a behavior of the second exemplary embodiment will be described with reference to FIGS. 8 and 9. Further, the description will made hereinbelow with respect to the process of decoding the wavelet transform coefficients LH, HL, and HH of the high-frequency subbands, supposing that the wavelet transform coefficient LL of the lowest-frequency subband is decoded with the same conventional method, and stored in the horizontal and vertical decomposition coefficient memory 123.

The coefficient decoding unit 221 initializes the coefficient selection coordinates to (0, 0), and selects one group of the wavelet transform coefficients LH, HL, and HH of the respective high-frequency subbands located at the same spatial coordinates (step S201).

Next, the decoding coefficient selection unit 2211 selects the wavelet transform coefficient LH as the decoding object from the above group (step S202). Next, the reference coefficient extraction unit 2212 extracts the wavelet transform coefficients LH, HL, and HH around the wavelet transform coefficient LH as the reference coefficients (step S203). Next, the encoding parameter calculation unit 2213 weights and adds the absolute values of the reference coefficients (step S204), and quantizes the weighted and added value to create the encoding parameter k for the Golomb-Rice code (step S205). Next, the coefficient variable-length decoding, unit 2214 utilizes the created encoding parameter k to decode the wavelet transform coefficient LH from the code inputted from the code input device 21 (step S206). The decoded wavelet transform coefficient LH is outputted to the horizontal and vertical decomposition coefficient memory 123.

Next, the decoding coefficient selection unit 2211 selects the wavelet transform coefficient HL as the decoding object from the above group (step S207). Next, the reference coefficient extraction unit 2212 extracts the wavelet transform coefficients LH, HL, and HH around the wavelet transform coefficient HL as the reference coefficients (step S208). Next, the encoding parameter calculation unit 2213 weights and adds the absolute values of the reference coefficients (step S209), and quantizes the weighted and added value to create the encoding parameter k for the Golomb-Rice code (step S210). Next, the coefficient variable-length decoding unit 2214 utilizes the created encoding parameter k to decode the wavelet transform coefficient HL from the code inputted front the code input device 21 (step S211). The decoded wavelet transform coefficient HL is outputted to the horizontal and vertical decomposition coefficient memory 123.

Next, the decoding coefficient selection unit 2211 selects the wavelet transform coefficient HH as the decoding object from the above group (step S212). Next, the reference coefficient extraction unit 2212 extracts the wavelet transform coefficients LH, HL, and HH around the wavelet transform coefficient HH as the reference coefficients (step S213). Next, the encoding parameter calculation unit 2213 weights and adds the absolute values of the reference coefficients (step S214), and quantizes the weighted and added value to create the encoding parameter k for the Golomb-Rice code (step S215). Next, the coefficient variable-length decoding unit 2214 utilizes the created encoding parameter k to decode the wavelet transform coefficient HH from the code inputted from the code input device 21 (step S216). The decoded wavelet transform coefficient HH is outputted to the horizontal and vertical decomposition coefficient memory 123.

The coefficient decoding unit 221 scans the coefficient selection coordinates to the next in a raster scanning order (step S217), and determines whether or not the decoding process is finished for every group of the wavelet transform coefficients LH, HL, and HH of the high-frequency subbands (step S218). If not, the process moves back to the step S201 to repeat the same process as described hereinabove for the next group of the wavelet transform coefficients LH, HL, and HH of the respective high-frequency subbands of the same spatial coordinates. If the decoding process is finished for every group of the wavelet transform coefficients LH, HL, and HH, the coefficient decoding unit 221 ends the process of FIG. 9.

Subsequently, the vertical wavelet combination unit 222 carries out vertical wavelet combination for the wavelet transform coefficients LL, LH, HL, and HH stored in the horizontal and vertical decomposition coefficient memory 123, and stores the acquired horizontal decomposition coefficients L and H in the horizontal decomposition coefficient memory 122 (step S219).

Subsequently, the horizontal wavelet combination unit 223 carries out horizontal wavelet combination for the acquired horizontal decomposition coefficients L and H stored in the horizontal decomposition coefficient memory 122, and stores the acquired pixel data in the image memory 133 (step S220).

The image stored in the image memory 133 is outputted to the image output device 24.

The second exemplary embodiment corresponds to a decoding, device for decoding the data encoded in the first exemplary embodiment. There is an advantage that the compression ratio can be improved by optimizing the encoding parameters k.

Next, a third exemplary embodiment of the present invention will be described in detail with reference to the accompanying drawings.

Figure 10:
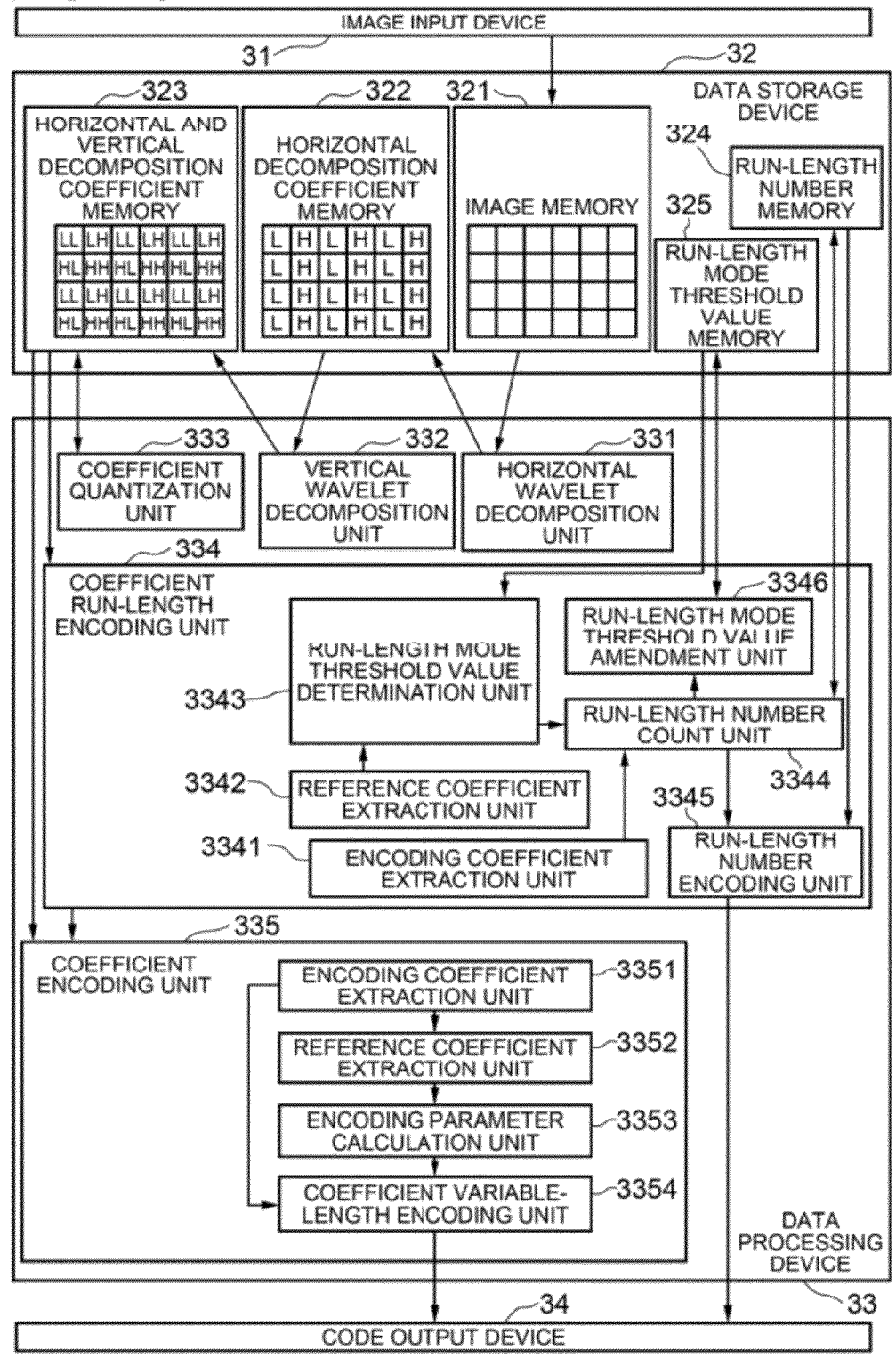
FIG. 10 is a block diagram of a wavelet transform encoding apparatus in accordance with a third exemplary embodiment of the present invention.

In reference to FIG. 10, the third exemplary embodiment of the present invention is comprised of an image input device 31, a data storage device 32, a data processing device 33 operating nuclei program control, and a code output device 34.

The image input device 31 is the same as the image input device 11 of FIG. 1 in accordance with the first exemplary embodiment.

The data storage device 32 includes an image memory 321, a horizontal decomposition coefficient memory 322, a horizontal and vertical decomposition coefficient memory 323, a run-length number memory 324, and a run-length mode threshold value memory 325. The image memory 321, the horizontal decomposition coefficient memory 322, and the horizontal and vertical decomposition coefficient memory 323 are the same as the image memory 121, the horizontal decomposition coefficient memory 122, and the horizontal and vertical decomposition coefficient memory 123 of FIG. 1 in accordance with the first exemplary embodiment, respectively.

The run-length number memory 324 stores one as the initial value in encoding each hierarchy. Further, it is counted up when the encoding object wavelet transform coefficients LH, HL, and HH of the same coordinates become all zero after quantization.

The run-length mode threshold value memory 325 stores a threshold value for determining whether or not to enter the run-length mode.

The data processing device 33 includes a horizontal wavelet decomposition unit 331, a vertical wavelet decomposition unit 332, a coefficient quantization unit 333, a coefficient run-length, encoding unit 334, and at coefficient encoding unit 335. The horizontal wavelet decomposition unit 331, the vertical wavelet decomposition unit 332, and the coefficient encoding unit 335 are the same as the horizontal wavelet decomposition unit 131, the vertical wavelet decomposition unit 132, and the coefficient encoding unit 134 of FIG. 1 in accordance with the first exemplary embodiment, respectively. The encoding coefficient extraction unit 3351, the reference coefficient extraction unit 3352, the encoding parameter calculation unit 3353, and the coefficient variable-length encoding unit 3354 which constitute the coefficient encoding unit 335 are the same as the encoding coefficient extraction unit 1341, the reference coefficient extraction unit 1342, the encoding parameter calculation unit 1343, and the coefficient variable-length encoding unit 1344 of FIG. 1 in accordance with the first exemplary embodiment, respectively.

The coefficient quantization unit 333 carries out operations such as division, right shift, and the like by a predetermined value for the wavelet transform coefficients LH, HL, and HH of the respective subbands stored in the horizontal and vertical decomposition coefficient memory 323 to quantize the same. The quantized wavelet transform coefficients LH, HL, and HH are stored back in the horizontal and vertical decomposition coefficient memory 323.

The coefficient run-length encoding unit 334 encodes as the run-length number the number of the groups in which the wavelet transform coefficients LH, HL, and HH of the high-frequency subbands of the same coordinates become all zero after quantization and which have successively appeared in a raster scanning order. The coefficient run-length encoding unit 334 is comprised of an encoding coefficient extraction unit 3341, a reference coefficient extraction unit 3342, a run-length mode threshold value determination unit 3343, a run-length number count unit 3344, a run-length number encoding unit 3345, and a run-length mode threshold value amendment unit 3346.

The encoding coefficient extraction unit 3341 extracts the next group of the encoding object wavelet transform coefficients LH, HL, and HH of the high-frequency subbands of the same coordinates in a raster scanning order.

Figure 11:
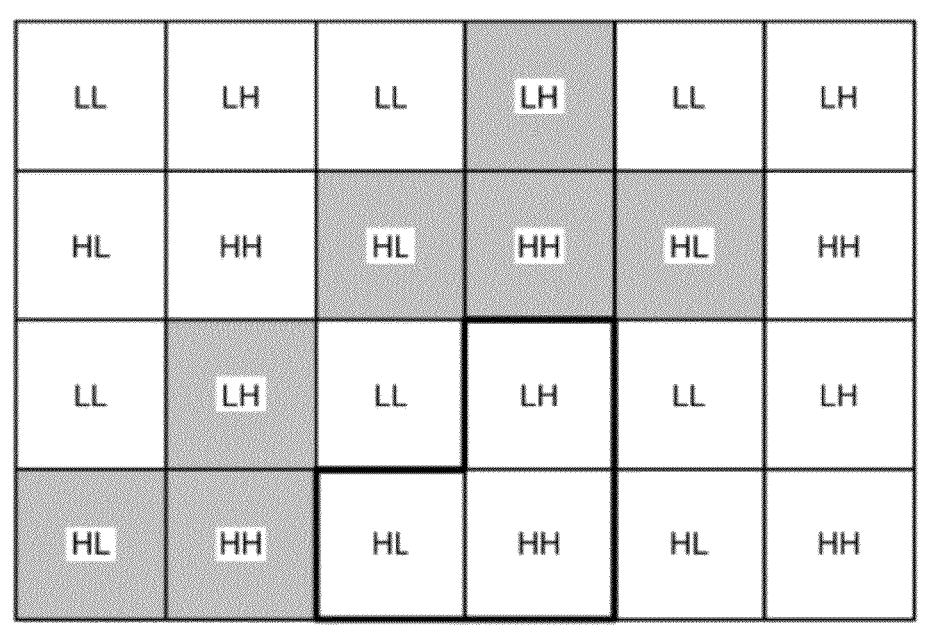

The reference coefficient extraction unit 3342 extracts the reference wavelet transform coefficients for determining whether or not to enter the run-length mode. In particular, in a state out of the run-length mode, supposing that the next group of the encoding, object wavelet transform coefficients LH, HL, and HH is the portion encircled with the bold solid line of FIG. 11, the hatched seven wavelet transform coefficients in total are extracted as the reference coefficients as follows. In addition, (i, j) is supposed to be the coordinate value of the encoding object wavelet transform coefficient LH within the bold solid line.

(1) the wavelet transform coefficient LH of the coordinate value (i, j−1);
(2) the wavelet transform coefficient HL of the coordinate value (i, j−1);
(3) the wavelet transform coefficient HH of the coordinate value (i, j−1);
(4) the wavelet transform coefficient HL of the coordinate value (i+1, j−1);
(5) the wavelet transform coefficient LH of the coordinate value (i−1, j);
(6) the wavelet transform coefficient HL of the coordinate value (i−1, j); and
(7) the wavelet transform coefficient HH of the coordinate value (i−1, j).

However, a predetermined value is utilized for wavelet transform coefficients of no corresponding coordinate values.

The run-length mode threshold value determination unit 3343 seeks the summation S of the absolute values of the seven wavelet transform coefficients in total extracted by the reference coefficient extraction unit 3342, and further seeks the value of multiplying S and a predetermined constant $\alpha$. Next, the value $\alpha S$ is compared with the run-length mode threshold value T stored in the run-length mode threshold value memory 325. Next, if the following Expression 1 is satisfied, then determination is made to enter the run-length mode; if not, then determination is made not to enter the run-length mode.

$$\alpha S \leq T \quad \quad 1$$

Under the run-length mode, if the next encoding object wavelet transform coefficients LH, HL, and HH of the same coordinates are all zero after quantization, the run-length number count unit 3344 counts up the run-length number (initial value=1) stored in the run-length number memory 324. Further, if any of the wavelet transform coefficients LH, HL, and HH is nonzero after quantization, the run-length number count unit 3344 informs the run-length number encoding unit 3345 and the run-length mode threshold value amendment unit 3346 of the run-length number stored in the run-length number memory 324 at that moment, and requests to encode the run-length number and amend the run-length mode threshold value.

The run-length number encoding unit 3345 encodes the run-length number stored in the run-length number memory 324 by a Gamma code, for example, and outputs the result to the code output device 34.

If the run-length number stops at one, then the run-length mode threshold value amendment unit 3346 decreases the run-length mode threshold value T by on; if not, then it increases the run-length mode threshold value T by one.

If the process has not entered the run-length mode or has exited the run-length mode, the next group of the encoding object wavelet transform coefficients LH, HL, and HH is encoded to Golomb-Rice codes by the same method of the first exemplary embodiment at the coefficient encoding unit 335.

The code output device 34 is the same as the code output device 34 of FIG. 1 in accordance with the first exemplary embodiment.

Figure 12:
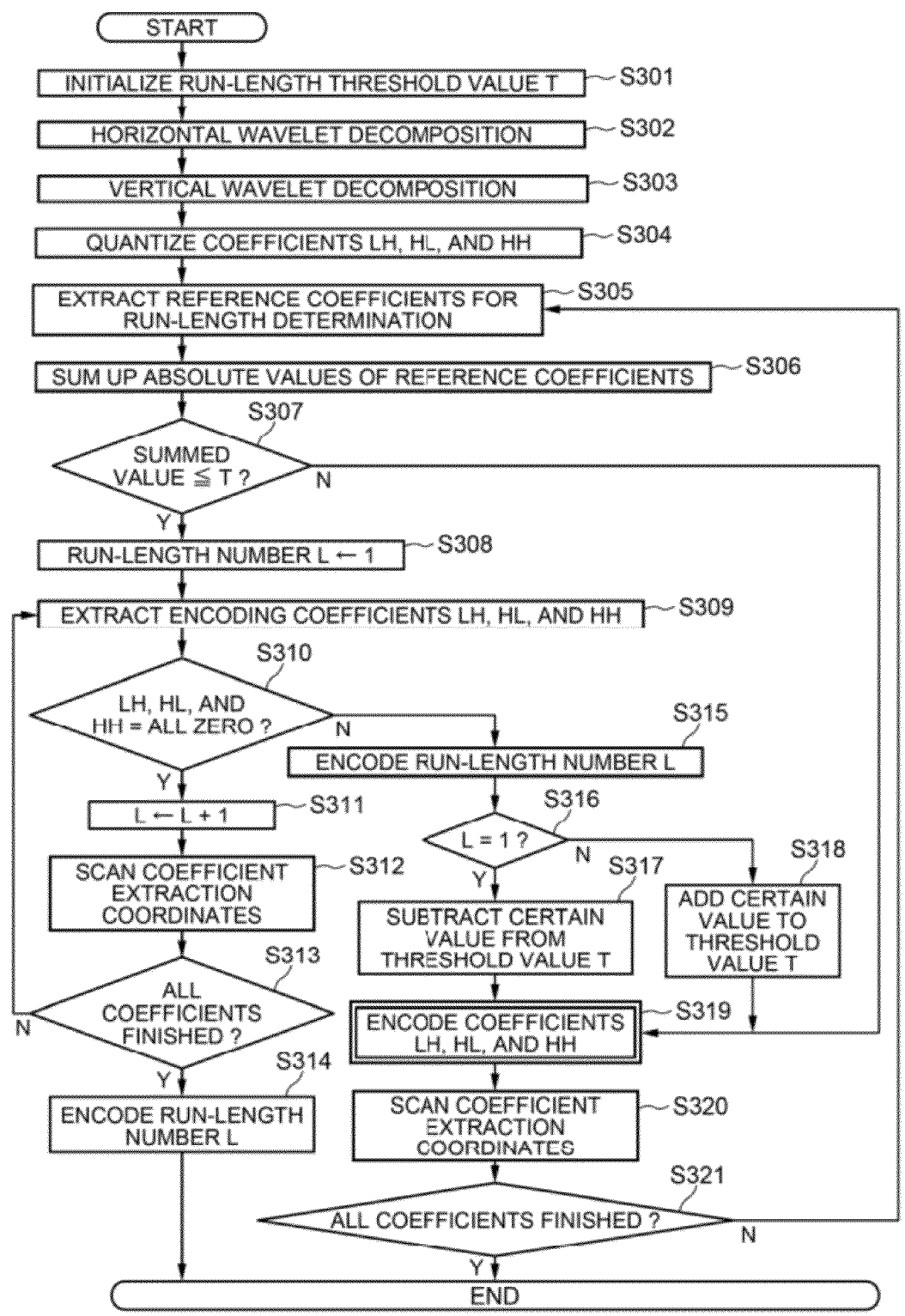
FIG. 12 is a flowchart showing a behavior of the wavelet transform encoding apparatus in accordance with the third exemplary embodiment of the present invention.

Next, an overall behavior of the third exemplary embodiment will be described with reference to the flowchart of FIG. 12.

First, before the process begins, the run-length mode threshold value T stored in the run-length mode threshold value memory 325 is initialized to a predetermined initial value (step S301).

Once an image is inputted from the image input device 31 to the image memory 321, the horizontal wavelet decomposition unit 331 carries out horizontal wavelet decomposition for the input image, and stores the acquired horizontal decomposition coefficients L and H in the horizontal decomposition coefficient memory 322 (step S302). Subsequently, the vertical wavelet decomposition unit 332 carries out vertical wavelet decomposition for the horizontal decomposition coefficients stored in the horizontal decomposition coefficient memory 322, and stores the acquired wavelet transform coefficients LL, LH, HL, and HH in the horizontal and vertical decomposition coefficient memory 323 (step S303).

Next, the coefficient quantization unit 333 quantizes the wavelet transform coefficients LL, LH, HL, and HH stored in the horizontal and vertical decomposition coefficient memory 323 (step S304).

Next, the coefficient run-length encoding unit 334 initializes the extraction coordinates to (0, 0). Then, the reference coefficient extraction unit 3342 extracts the reference wavelet transform coefficients for determining whether or not to enter the run-length mode from the horizontal and vertical decomposition coefficient memory 123 (step S305).

Next, the run-length mode threshold value determination unit 3343 calculates the summation S of the absolute values of the wavelet transform coefficients extracted by the reference coefficient extraction unit 3342 (step S306) and, further, determines whether or not the value of multiplying the summation S and a constant a exceeds the run-length mode threshold value T (step S307).

If $\alpha S$ exceeds T, then the run-length mode is not entered. The group of the wavelet transform coefficients LH, HL, and HH in the extraction coordinates is encoded to Golomb-Rice codes by the coefficient encoding unit 335 according to the same method as by the coefficient encoding unit 134 in accordance with the first exemplary embodiment, and then outputted to the code output device 34 (step S320).

On the other hand, if $\alpha S$ does not exceed T, then the run-length mode is entered. First, the run-length number count unit 3344 sets the run-length number of the run-length number memory 324 to 1 (step S308). Next, the encoding coefficient extraction unit 3341 extracts the group of the wavelet transform coefficients LH, HL, and HH of the extraction coordinates from the horizontal and vertical decomposition coefficient memory 323 (step S309).

Next, the run-length number count unit 3344 determines whether or not the extracted wavelet transform coefficients LH, HL, and HH are all zero (step S310).

If the extracted wavelet transform coefficients LH, HL, and HH are all zero, then the run-length number count unit 3344 counts up the run-length number of the run-length number memory 324 by one (step S311). Next, it scans the coefficient extraction coordinates in a raster scanning direction (step S312), and determines whether or not the encoding is finished for all wavelet transform coefficients LH, HL, and HH (step S313). If finished, then the run-length number encoding unit 3345 encodes the run-length number of the run-length number memory 324, and ends the process of FIG. 12. If the encoding is not finished for all wavelet transform coefficients LH, HL, and HH, then the process moves back to the step S309, and the same process as described hereinabove is repeated for the next group of the encoding object wavelet transform coefficients LH, HL, and HH.

On the other hand, if the wavelet transform coefficients LH, HL, and HH are not all zero, then the run-length number encoding unit 3345 encodes the run-length number of the run-length number memory 324, and outputs the result to the code output device 34 (step S315). Next, the run-length mode threshold value amendment unit 3346 determines whether or not the stopped run-length number is one (step S316). If it is one, then a certain value is subtracted from the run-length mode threshold value (step S317); if it is greater than one, then a certain value is added to the run-length mode threshold value (step S318). Then, the run-length mode is exited. The group of the wavelet transform coefficients LH, HL, and HH of the extraction coordinates is encoded by the coefficient encoding unit 335 to Golomb-Rice codes, and then outputted to the code output device 34 (step S319).

Subsequently, the coefficient extraction coordinates are scanned (step S320) to determine whether or not the encoding is finished for all wavelet transform coefficients LH, HL, and HH (step S321). If finished, then the process of FIG. 12 is ended; if unfinished, then it moves back to the step S305 to repeat the same process as described hereinabove.

In this manner, according to the third exemplary embodiment, by including the coefficient run-length encoding unit 334, it is possible to improve the compression ratio when zero frequently occurs in the quantized wavelet transform coefficients LH, HL, and HH.

Further, the run-length mode is introduced to determine from the surrounding coefficients the possibility of the wavelet transform coefficients LH, HL, and HH being all zero. If the possibility is considered low, the encoding side (and the decoding side which will be described hereinafter) is configured not to determine that those coefficients are all zero. Therefore, it is possible to avoid wastefully outputting a code (flag) of the run-length number=0 indicating that the coefficients are not all zero.

Further, the threshold value to be compared with the summation of the absolute values of the surrounding coefficients for determining whether or not to enter the run-length mode is decreased by one for further tightening the condition for the case that the run-length number has stopped at one, but increased by one for loosening the condition otherwise so as to make amendment according to the situation. Therefore, it is possible to lower the occurrence probability of the case (or the opposite case) that after entering the run-length mode, the wavelet transform coefficients LH, HL, and HH are found actually not all zero.

Next, a fourth exemplary embodiment of the present invention will be described with reference to the accompanying drawings.

Figure 13:
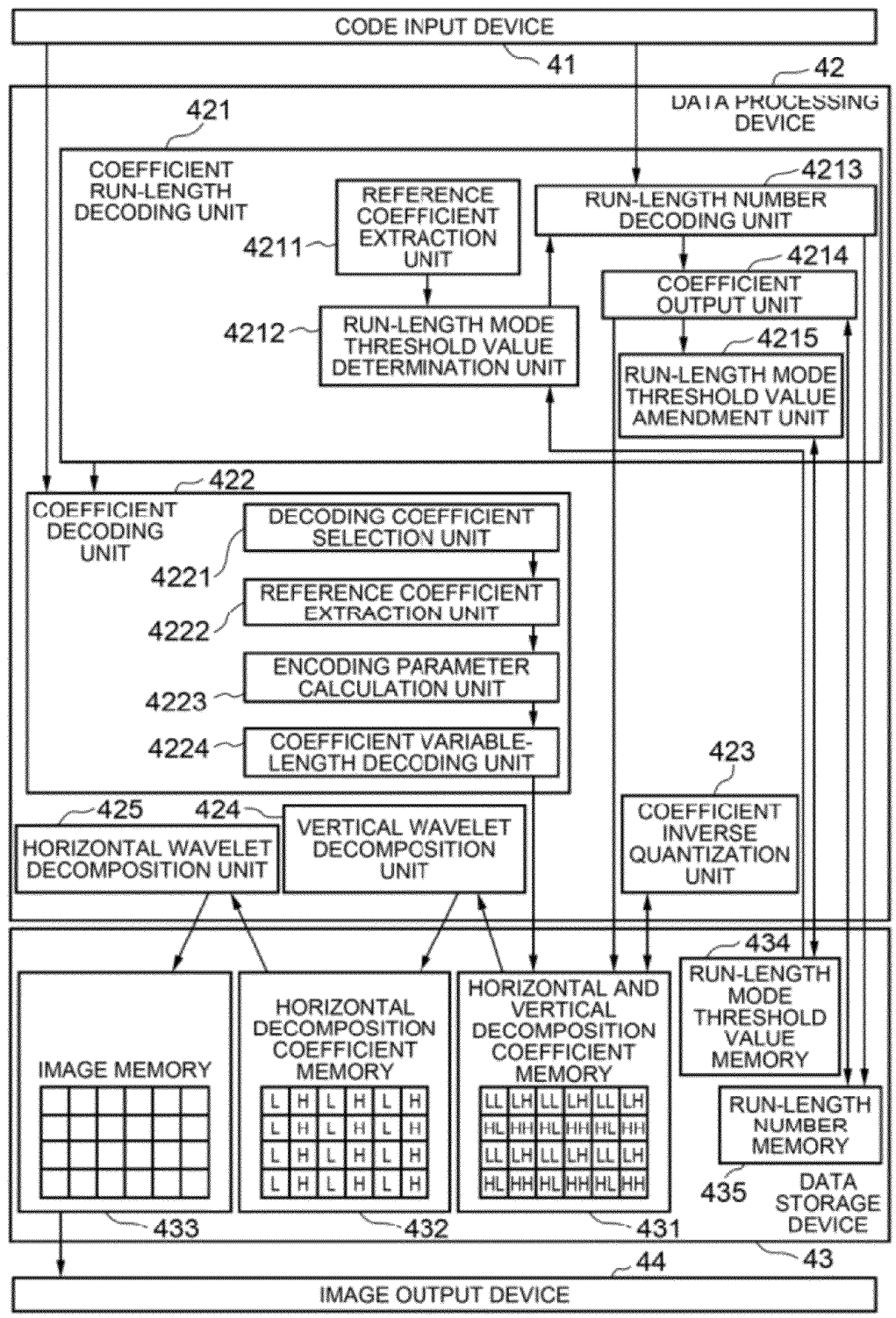
FIG. 13 is a block diagram of a wavelet transform encoding apparatus in accordance with a fourth exemplary embodiment of the present invention.

In reference to FIG. 13, the fourth exemplary embodiment of the present invention is comprised of a code input device 41, a data processing device 42 operating under program control, a data storage device 43, and an image output device 44.

The code input device 41 is a device for inputting decoding object codes and comprised, for example, of a magnetic disk device, a communication device, and the like.

The data storage device 43 includes a horizontal and vertical decomposition coefficient memory 431, a horizontal decomposition coefficient memory 432, an image memory 433, a run-length mode threshold value memory 434, and at run-length number memory 435.

The horizontal and vertical decomposition coefficient memory 431 stores the wavelet transform coefficients LH, HL, and HH of the high-frequency subbands and the wavelet transform coefficient LL of the lowest-frequency subband which have been decoded by the data processing device 42.

The horizontal decomposition coefficient memory 432 stores the horizontal decomposition coefficients decoded by the data processing device 42.

The image memory 433 stores the image decoded by the data processing device 42.

The run-length mode threshold value memory 434 stores at threshold value decoded by the data processing device 42 for determining whether or not to enter the run-length mode.

The run-length number memory 435 stores a run-length number decoded by the data processing device 42.

The data processing device 42 includes a coefficient run-length decoding unit 421, a coefficient decoding unit 424, a coefficient inverse quantization unit 423, a vertical wavelet combination unit 424, and a horizontal wavelet combination unit 425.

The coefficient run-length decoding unit 421 decodes as the run-length number the number of the groups in which the wavelet transform coefficients LH, HL, and HH of the high-frequency subbands of the same coordinates are all zero and which have successively appeared in a raster scanning order. The coefficient run-length decoding unit 421 is comprised of a reference coefficient extraction unit 4211, a run-length mode threshold value determination unit 4212, a run-length number decoding unit 4213, a coefficient output unit 4214, and a run-length mode threshold value amendment unit 4215.

The reference coefficient extraction unit 4211 extracts the reference wavelet transform coefficients for determining whether or not to enter the run-length mode. The reference wavelet transform coefficients are the same as in encoding. That is, in a state out of the run-length mode, supposing that the next group of the decoding object wavelet transform coefficients LH, HL, and HH is the portion encircled with the bold solid line of FIG. 11, the hatched seven wavelet transform coefficients in total are extracted as the reference coefficients.

The run-length mode threshold value determination unit 4212 utilizes the Expression 1 described hereinbefore to determine whether or not to enter the run-length mode according to the same method as in encoding based on the seven wavelet transform coefficients in total extracted by the reference coefficient extraction unit 4211.

Under the run-length mode, the run-length number decoding unit 4213 decodes the run-length number and stores it in the run-length number memory 435.

The coefficient output unit 4214 decreases the run-length number by one if the run-length number stored in the run-length number memory 435 is greater than one, stores the group of the wavelet transform coefficients LH, HL, and HH of the same coordinates respectively with the value of zero in the horizontal and vertical decomposition coefficient memory 431, and repeats the process of scanning the coefficient output coordinates until the run-length number becomes one, or the decoding is finished for all wavelet transform coefficients LH, HL, and HH of the high-frequency subbands.

The run-length mode threshold value amendment unit 4215 amends the run-length mode threshold value T according to the same method as in encoding. That is, if the run-length number stops at one, it decreases the run-length mode threshold value T by one; if not, it increases the run-length mode threshold value T by one.

If the process has not entered the run-length mode or has exited the run-length mode, the coefficient decoding unit 422 decodes the code inputted from the code input device 41, and creates the wavelet transform coefficients LH, HL, and HH of the high-frequency subbands of the coefficient output coordinates. The coefficient decoding unit 422 carries out decoding for each of the multiple groups of the wavelet transform coefficients LH, HL, and HH located spatially at the same position within the multiple high-frequency subbands belonging to the same hierarchy. The created wavelet transform coefficients LH, HL, and HH are stored in the horizontal and vertical decomposition coefficient memory 431. Graphical interpretation is omitted for the decoding unit for creating the wavelet transform coefficient LL of the lowest-frequency subband from the code inputted from the code input device 41. The wavelet transform coefficient LL of the lowest-frequency subband is also stored in the horizontal and vertical decomposition coefficient memory 431.

The coefficient decoding unit 422 is comprised of a decoding coefficient selection unit 4221, a reference coefficient extraction unit 4222, an encoding parameter calculation unit 4223, and a coefficient variable-length decoding unit 4224. These are the same as the decoding coefficient selection unit 2211, the reference coefficient extraction unit 2212, the encoding parameter calculation unit 2213, and the coefficient variable-length decoding unit 1214 of FIG. 8 in accordance with the second exemplary embodiment of the present invention.

The coefficient inverse quantization unit 423 carries out operations in an opposite manner to those in encoding such as multiplication, left shift, and the like for the wavelet transform coefficients LH, HL, and HH stored in the horizontal and vertical decomposition coefficient memory 431 to inverse-quantize the same.

The vertical wavelet combination unit 424 reads out the wavelet transform coefficients LL, LH, HL, and HH stored in the horizontal and vertical decomposition coefficient memory 431 one line at a time in a vertical direction to carry out vertical wavelet combination, and stores the acquired horizontal decomposition coefficients L and H in the horizontal decomposition coefficient memory 432.

The horizontal wavelet combination unit 425 reads out the horizontal decomposition coefficients L and H stored in the horizontal decomposition coefficient memory 432 one line at a time in a horizontal direction to carry out horizontal wavelet combination, and stores the acquired pixel data in the image memory 433.

The image output device 44 is constituted by such as a display device for reading out and outputting the pixel data stored in the image memory 433.

Figure 14:
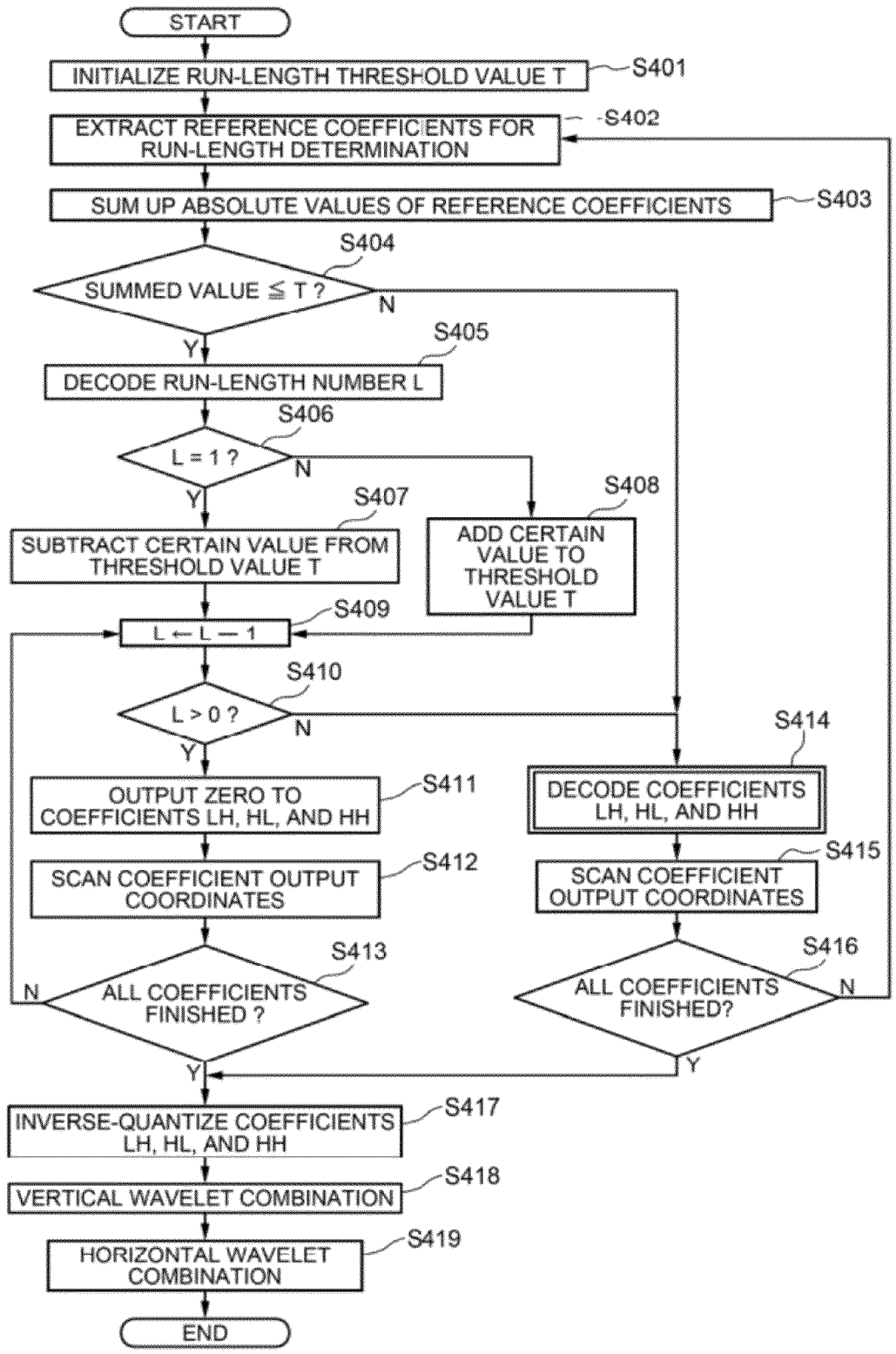
FIG. 14 is a flowchart, showing a behavior of the wavelet transform encoding apparatus in accordance with the fourth exemplary embodiment of the present invention.

Next, a behavior of the fourth exemplary embodiment will be described with reference to FIGS. 13 and 14. Further, the description will made hereinbelow with respect to the process of decoding the wavelet transform coefficients LH, HL, and HH of the high-frequency subbands, supposing that the wavelet transform coefficient LL of the lowest-frequency subband is decoded with the same conventional method, and stored in the horizontal and vertical decomposition coefficient memory 431.

First, the run-length mode threshold value amendment unit 4215 of the coefficient run-length decoding unit 421 initializes the run-length mode threshold value T stored in the run-length mode threshold value memory 434 (step S401). Next, supposing that the coefficient output coordinates are at the origin (0, 0) of the initial value, the reference coefficient extraction unit 4211 extracts the reference wavelet transferal coefficients for determining whether or not to enter the run-length mode (step S402).

Next, the run-length mode threshold value determination unit 4212 calculates the summation S of the absolute values of the extracted wavelet transform coefficients (step S403). Further, it seeks the value of multiplying the summation S and a predetermined constant α, and compares the value αS with the run-length mode threshold value T stored in the run-length mode threshold value memory 434 (step S404). Then, if the Expression 1 described hereinabove is satisfied, then determination is made to enter the run-length mode; if not, then determination is made not to enter the run-length mode.

If the run-length mode is not entered, then the process moves on to the step S414.

If the run-length mode is entered, then the run-length number decoding unit 4213 decodes the run-length number from the code inputted from the code input device 41, and stores the result in the run-length number memory 435 (step S405). Next, the run-length mode threshold value amendment unit 4215 subtracts a certain value from the run-length mode threshold value stored in the run-length mode threshold value memory 434 if the decoded run-length number is equal to one (step S407); otherwise it adds a certain value to the run-length mode threshold value (step S408).

Next, the coefficient output unit 4214 decrease the run-length number stored in the run-length number memory 435 by one (step S409). If the run-length number becomes zero, then the process moves on to the step S414.

If the run-length number is not zero, then the coefficient output unit 4214 outputs the group of the wavelet transform coefficients LH, HL, and HH respectively with the value of zero to the horizontal and vertical decomposition coefficient memory 431 (step S411). Next, the coefficient output unit 4214 scans the coefficient output coordinates in a raster scanning direction (step S412). Then, it determines whether or not the decoding is finished for all groups of the wavelet transform coefficients LH, HL, and HH of the high-frequency subbands. If unfinished, then the process moves back to the step S409 to repeat the same process as described hereinabove; if finished, then the process moves on to the step S417.

If the process has moved to the step S414, then the coefficient decoding unit 422 decodes the group of the wavelet transform coefficients LH, HL, and HH located at the position of the coefficient output coordinates from the code inputted from the code input device 41, and outputs the result to the horizontal and vertical decomposition coefficient memory 431. Next, the coefficient decoding unit 422 scans the coefficient output coordinates (step S415) to determine whether or not the decoding is finished for all groups of the wavelet transform coefficients LH, HL, and HH of the high-frequency subbands (step S416). If unfinished, then the process moves back to the step S402 to repeat the same process as described hereinabove; if finished, then the process moves on to the step S417.

If the process has moved to the step S417, then the coefficient inverse quantization unit 423 carries out inverse quantization for the wavelet transform coefficients LL, LH, HL, and HH stored in the horizontal and vertical decomposition coefficient memory 431 (step S417).

Next, the vertical wavelet combination unit 424 carries out vertical wavelet combination for the inverse-quantized wavelet transform coefficients LL, LH, HL, and HH stored in the horizontal and vertical decomposition coefficient memory 431, and stores the acquired horizontal decomposition coefficients L and H in the horizontal decomposition coefficient memory 432 (step S418).

Next, the horizontal wavelet combination unit 425 carries out horizontal wavelet combination for the horizontal decomposition coefficients L and H stored in the horizontal decomposition coefficient memory 432, and stores the acquired pixel data in the image memory 433 (step S419).

The image stored in the image memory 433 is outputted to the image output device 44.

The fourth exemplary embodiment corresponds to a decoding device for decoding the data encoded in the third exemplary embodiment. There is an advantage that the compression ratio can be improved by optimization and run-length process of the encoding parameters k.

Hereinabove, the descriptions were made with respect to the exemplary embodiments of the present invention. However, the present invention is not limited to the above exemplary embodiments only, but able to apply various additional modifications thereto. For example, as a variable-length code, the Golomb-Rice code was utilized. However, it is also possible to utilize other kinds of variable-length codes. For example, it is also possible to utilize a Huffman code which switches multiple kinds of Huffman tables with an encoding parameter.

Further, as a matter of course, the functions of the present invention can be realized by hardware. However, they can also be realized by a computer and program. The program is recorded and provided in a computer-readable record medium such as magnetic disks, semiconductor memories, and the like, and read out by the computer at the time of being started up and the like so as to control the behavior of the computer and thus make the computer function as each of the units in accordance with the respective exemplary embodiments described hereinabove.

The invention claimed is:

1. A wavelet transform encoding apparatus comprising: a wavelet transform unit for decomposing a two-dimensional signal into subbands which are multiple frequency domains; and a coefficient encoding unit for performing a grouping process and an encoding process alternately, wherein the grouping process is performed to extract three wavelet transform coefficients LH, HL and HH located spatially at the same position as a group in the order of being raster scanned within multiple high-frequency subbands belonging to the same hierarchy, and the encoding process is performed to encode the wavelet transform coefficients LH, HL and HH included in the group composed in the grouping process, and the grouping process and the encoding process are repeated alternately, wherein the coefficient encoding unit comprises: an encoding parameter calculation unit for calculating an encoding parameter for each of the wavelet transform coefficients LH, HL and HH of an encoding object based on multiple encoded vicinal wavelet transform coefficients LH, HL and HH within the multiple high-frequency subbands belonging to the same hierarchy; and a coefficient variable-length encoding unit for encoding the wavelet transform coefficients LH, HL and HH of the encoding object into a variable-length code by utilizing the encoding parameter calculated by the encoding parameter calculation unit.

2. The wavelet transform encoding apparatus according to claim 1, wherein within the group, the coefficient encoding unit carries out encoding in the order of a wavelet transform coefficient LH, a wavelet transform coefficient HL, and a wavelet transform coefficient HH.

3. The wavelet transform encoding apparatus according to claim 2, wherein in the multiple wavelet transform coefficients for calculating the encoding parameter for the wavelet transform coefficient HL is included the wavelet transform coefficient LH located spatially at the same position as the wavelet transform coefficient HL.

4. The wavelet transform encoding apparatus according to claim 2, wherein in the multiple wavelet transform coefficients for calculating the encoding parameter for the wavelet transform coefficient HH are included the wavelet transform coefficients LH and HL located spatially at the same position as the wavelet transform coefficient HH.

5. The wavelet transform encoding apparatus according to claim 2, wherein supposing that the coordinates of the encoding object wavelet transform coefficients LH, HL, and HH are (i, j), the encoding parameter calculation unit calculates:

the encoding parameter for the wavelet transform coefficients LH based on:
  the wavelet transform coefficient LH of the coordinate value (i, j−1);
  the wavelet transform coefficient LH of the coordinate value (i−1, j);
  the wavelet transform coefficient HL of the coordinate value (i, j−1);
  the wavelet transform coefficient HL of the coordinate value (i+1, j−1);
  the wavelet transform coefficient HH of the coordinate value (i, j−1); and
  the wavelet transform coefficient HH of the coordinate value (i−1, j), the encoding parameter for the wavelet transform coefficients HL based on:
  the wavelet transform coefficient HL of the coordinate value (i, j−1);
  the wavelet transform coefficient HL of the coordinate value (i−1, j);
  the wavelet transform coefficient LH of the coordinate value (i−1, j−1);
  the wavelet transform coefficient LH of the coordinate value (i, j); and
  the wavelet transform coefficient HH of the coordinate value (i−1, j), and the encoding parameter for the wavelet transform coefficients HH based on:
  the wavelet transform coefficient HH of the coordinate value (i, j−1);
  the wavelet transform coefficient HH of the coordinate value (i−1, j);
  the wavelet transform coefficient LH of the coordinate value (i, j); and
  the wavelet transform coefficient HL of the coordinate value (i, j).

6. The wavelet transform encoding apparatus according to claim 1, wherein the encoding parameter calculation unit calculates the encoding parameter by quantizing a weighted summation of the absolute values of the multiple wavelet transform coefficients.

7. The wavelet transform encoding apparatus according to claim 6, wherein the encoding parameter calculation unit determines the encoding parameter by referring to a table maintaining a correspondence relationship between values of the weighted summation and the encoding parameter after nonlinear quantization.

8. The wavelet transform encoding apparatus according to claim 1 further comprising:
  a coefficient quantization unit for quantizing the wavelet transform coefficients within the high-frequency subbands; and
  a coefficient run-length encoding unit for encoding the number of successively appearing groups in which the wavelet transform coefficients become all zero after quantization with respect to each of the multiple groups of the wavelet transform coefficients, as a run-length number, the coefficient encoding unit taking the wavelet transform coefficients of the group in which the wavelet transform coefficients have not become all zero after quantization, as the encoding object.

9. The wavelet transform encoding apparatus according to claim 8, wherein out of the run-length mode, prior to encoding a group of the wavelet transform coefficients LH, HL, and HH, the coefficient run-length encoding unit compares a threshold value with the summation of the absolute values of multiple encoded vicinal wavelet transform coefficients within the multiple subbands of the same hierarchy;

when the summation does not exceed the threshold value, then the run-length mode is entered;

otherwise, the run-length mode is not entered, and under the run-length mode, the coefficient run-length encoding unit determines whether or not the group of the wavelet transform coefficients LH, HL, and HH are all zero;

when all zero, then the run-length number is increased by one;

when not all zero, then the run-length mode is exited.

10. The wavelet transform encoding apparatus according to claim 9, wherein supposing that the coordinates of the encoding object wavelet transform coefficients LH, HL, and HH are (i, j), the coefficient run-length encoding unit compares the threshold value with the summation of the absolute values of:

(1) the wavelet transform coefficient LH of the coordinate value (i, j−1);
(2) the wavelet transform coefficient HL of the coordinate value (i, j−1);
(3) the wavelet transform coefficient HH of the coordinate value (i, j−1);
(4) the wavelet transform coefficient HL of the coordinate value (i+1, j−1);
(5) the wavelet transform coefficient LH of the coordinate value (i−1, j);
(6) the wavelet transform coefficient HL of the coordinate value (i−1, j); and
(7) the wavelet transform coefficient HH of the coordinate value (i−1, j).

11. The wavelet transform encoding apparatus according to claim 10, wherein the coefficient run-length encoding unit subtracts a certain value from the threshold value when the encoded run-length number does not exceed a predetermined value, and adds a certain value to the threshold value otherwise.

12. The wavelet transform encoding apparatus according to claim 1, wherein the variable-length code is a Golomb-Rice code.

13. A wavelet transform decoding apparatus comprising:

a coefficient decoding unit for decoding wavelet transform coefficients from a code string of variable-length codes into which are encoded multiple subband wavelet transform coefficients acquired by wavelet transform for each group of the wavelet transform coefficients LH, HL and HH located spatially at the same position within multiple high-frequency subbands belonging to the same hierarchy, the coefficient decoding unit comprising an encoding parameter calculation unit for calculating an encoding parameter for each of the wavelet transform coefficients LH, HL and HH of a decoding object based on multiple decoded vicinal wavelet transform coefficients LH, HL and HH within the multiple high-frequency subbands; and a coefficient variable-length decoding unit for decoding the wavelet transform coefficient of the decoding object by utilizing the encoding parameter calculated by the encoding parameter calculation unit.

14. The wavelet transform decoding apparatus according to claim 13, wherein within the group, the coefficient decoding unit carries out decoding in the order of a wavelet transform coefficient LH, a wavelet transform coefficient HL, and a wavelet transform coefficient HH.

15. The wavelet transform decoding apparatus according to claim 14 further comprising:

a coefficient run-length decoding unit for decoding a run-length number from the code string, and decreasing the decoded run-length number while outputting the groups in which the wavelet transform coefficients are all zero when the decoded run-length number indicates that there is one or more successive groups in which the wavelet transform coefficients are all zero in value, the coefficient decoding unit then not carrying out decoding process; and a coefficient inverse quantization unit for inverse-quantizing the decoded wavelet transform coefficients.

16. A wavelet transform encoding method comprising the steps of: decomposing a two-dimensional signal into subbands which are multiple frequency domains; a grouping process and an encoding process performed alternately, wherein the grouping process is performed to extract three wavelet transform coefficients LH, HL and HH located spatially at the same position as a group in the order of being raster scanned within multiple high-frequency subbands belonging to the same hierarchy, and the encoding process is performed to encode the wavelet transform coefficients LH, HL and HH included in the group composed in the grouping process, and the grouping process and the encoding process are repeated alternately; in the step of encoding wavelet transform coefficients for each group, calculating the encoding parameter for each of the wavelet transform coefficients LH, HL and HH of an encoding object based on multiple encoded vicinal wavelet transform coefficients LH, HL and HH within the multiple high-frequency subbands belonging to the same hierarchy; and encoding the wavelet transform coefficients LH, HL and HH of the encoding object into a variable-length code by utilizing the calculated encoding parameter.

17. The wavelet transform encoding method according to claim 16, wherein in the step of encoding wavelet transform coefficients LH, HL and HH for each group, the encoding is carried out in the order of a wavelet transform coefficient LH, a wavelet transform coefficient HL, and a wavelet transform coefficient HH.

18. The wavelet transform encoding method according to claim 17, wherein in the multiple wavelet transform coefficients for calculating the encoding parameter for the wavelet transform coefficient HL is included the wavelet transform coefficient LH located spatially at the same position as the wavelet transform coefficient HL.

19. The wavelet transform encoding method according to claim 17, wherein in the multiple wavelet transform coefficients for calculating the encoding parameter for the wavelet transform coefficient HH are included the wavelet transform coefficients LH and HL located spatially at the same position as the wavelet transform coefficient HH.

20. The wavelet transform encoding method according to claim 16 further comprising the steps of:

quantizing the wavelet transform coefficients prior to encoding; and encoding the number of successively appearing groups in which the wavelet transform coefficients become all zero after quantization, as a run-length number, with respect to each of the multiple groups of the quantized wavelet transform coefficients, in the step of encoding wavelet transform coefficients for each group, the wavelet transform coefficients of the group in which the wavelet transform coefficients have not become all zero after quantization being taken as the encoding object.

21. A wavelet transform decoding method comprising the step of:

decoding wavelet transform coefficients from a code string of variable-length codes into which are encoded multiple subband wavelet transform coefficients acquired by wavelet transform for each group of the wavelet transform coefficients LH, HL and HH located spatially at the same position within multiple high-frequency subbands belonging to the same hierarchy, in the step of decoding wavelet transform coefficients for each group, calculating the encoding parameter for each of the wavelet transform coefficients LH, HL and HH of a decoding object based on multiple decoded vicinal wavelet transform coefficients LH, HL and HH within the multiple high-frequency subbands; and decoding the wavelet transform coefficient of the decoding object by utilizing the calculated encoding parameter.

22. The wavelet transform decoding method according to claim 21, wherein in the step of decoding wavelet transform coefficients for each group, the decoding is carried out in the order of a wavelet transform coefficient LH, a wavelet transform coefficient HL, and a wavelet transform coefficient HH.

23. The wavelet transform decoding method according to claim 21 further comprising the steps of: decoding a run-length number from the code string, and decreasing the decoded run-length number while outputting the groups in which the wavelet transform coefficients are all zero when the decoded run-length number indicates that there is one or more successive groups in which the wavelet transform coefficients are all zero in value; and inverse-quantizing the decoded wavelet transform coefficients.

24. A non-transitory computer-readable medium storing a wavelet transform encoding computer program product comprising computer implementable instructions to make a computer function as: a wavelet transform unit for decomposing a two-dimensional signal into subbands which are multiple frequency domains; and a coefficient encoding unit for performing a grouping process and an encoding process alternately, wherein the grouping process is performed to extract three wavelet transform coefficients LH, HL and HH located spatially at the same position as a group in the order of being raster scanned within multiple high-frequency subbands belonging to the same hierarchy, and the encoding process is performed to encode the wavelet transform coefficients LH, HL and HH included in the group composed in the grouping process, and the grouping process and the encoding process are repeated alternately, wherein the coefficient encoding unit comprises: an encoding parameter calculation unit for calculating an encoding parameter for the wavelet transform coefficients LH, HL and HH of an encoding object based on multiple encoded vicinal wavelet transform coefficients within the multiple high-frequency subbands belonging to the same hierarchy; and a coefficient variable-length encoding unit for encoding the wavelet transform coefficients LH, HL and HH of the encoding object into a variable-length code by utilizing the encoding parameter calculated by the encoding parameter calculation unit.

25. The non-transitory computer-readable medium storing wavelet transform encoding computer program product according to claim 24 further comprising computer implementable instructions to make the computer function as:

a coefficient quantization unit for quantizing the wavelet transform coefficients within the high-frequency subbands; and a coefficient run-length encoding unit for encoding the number of successively appearing groups in which the wavelet transform coefficients become all zero after quantization, as a run-length number, with respect to each of the multiple groups of the wavelet transform coefficients, the coefficient encoding unit taking the wavelet transform coefficients of the group in which the wavelet transform coefficients have not become all zero after quantization, as the encoding object.

26. A non-transitory computer-readable medium storing a wavelet transform decoding computer program product comprising computer implementable instructions to make a computer function as:

a coefficient decoding unit for decoding wavelet transform coefficients from a code string of variable-length codes into which are encoded multiple subband wavelet transform coefficients acquired by wavelet transform for each group of the wavelet transform coefficients LH, HL and HH located spatially at the same position within multiple high-frequency subbands belonging to the same hierarchy, the coefficient decoding unit comprising an encoding parameter calculation unit for calculating an encoding parameter for each of the wavelet transform coefficients LH, HL and HH of a decoding object based on multiple decoded vicinal wavelet transform coefficients LH, HL and HH within the multiple high-frequency subbands; and a coefficient variable-length decoding unit for decoding the wavelet transform coefficient of the decoding object by utilizing the encoding parameter calculated by the encoding parameter calculation unit.

27. The non-transitory computer-readable medium storing the wavelet transform decoding computer program product according to claim 26 further comprising computer implementable instructions to make the computer function as:

a coefficient run-length decoding unit for decoding a run-length number from the code string, and decreasing the decoded run-length number while outputting the groups in which the wavelet transform coefficients are all zero when the decoded run-length number indicates that there is one or more successive groups in which the wavelet transform coefficients are all zero in value, the coefficient decoding unit then not carrying out decoding process; and a coefficient inverse quantization unit for inverse-quantizing the decoded wavelet transform coefficients.

* * * * *